(12) United States Patent
Dix et al.

(10) Patent No.: US 11,154,008 B2
(45) Date of Patent: Oct. 26, 2021

(54) SYSTEM AND METHOD FOR STEERING AN AGRICULTURAL HARVESTER

(71) Applicant: CNH Industrial America LLC, New Holland, PA (US)

(72) Inventors: Peter J. Dix, Naperville, IL (US); Yaseen Suleman, Glendale Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 502 days.

(21) Appl. No.: 16/105,357

(22) Filed: Aug. 20, 2018

(65) Prior Publication Data
US 2020/0053961 A1 Feb. 20, 2020

(51) Int. Cl.
| | |
|---|---|
| *A01D 41/127* | (2006.01) |
| *A01D 45/02* | (2006.01) |
| *A01D 41/14* | (2006.01) |
| *A01D 43/08* | (2006.01) |

(52) U.S. Cl.
CPC ....... *A01D 41/1278* (2013.01); *A01D 41/141* (2013.01); *A01D 43/085* (2013.01); *A01D 45/021* (2013.01)

(58) Field of Classification Search
CPC .............. A01D 41/141; A01D 41/1278; A01D 45/021; B60W 2050/0075; G05D 1/0212; G05D 1/0227; G05D 1/0276; G05D 2201/0201; G01C 21/005; G01C 21/3859
See application file for complete search history.

(56) References Cited

U.S. PATENT DOCUMENTS

| | | | |
|---|---|---|---|
| 4,126,984 | A | 11/1978 | Gail |
| 4,505,094 | A | 3/1985 | Demorest |
| 4,528,804 | A | 7/1985 | Williams |
| (Continued) | | | |

FOREIGN PATENT DOCUMENTS

| | | |
|---|---|---|
| DE | 3104779 A1 | 2/1982 |
| EP | 0136548 A1 | 4/1985 |
| (Continued) | | |

OTHER PUBLICATIONS

PCT Search Report issued in corresponding Application No. PCT/US2019/046977 dated Nov. 4, 2019 (14 pages).

*Primary Examiner* — Alicia Torres
(74) *Attorney, Agent, or Firm* — Rickard K. DeMille; Rebecca L. Henkel

(57) ABSTRACT

In one aspect, a system for operating an agricultural harvester may include a sensor assembly configured to detect a parameter indicative of an operating line of the harvester. The system may also include a controller configured to monitor the operating line of the harvester based on measurement signals received from the sensor assembly when the harvester is operated in a first operating mode. The controller may also be configured to determine a differential between the operating line and a predetermined guidance line of the harvester. Furthermore, the controller may be configured to update a stored correction value based on the determined differential. Additionally, when the harvester is switched from the first operating mode to a second operating mode, the controller may be configured to adjust a location of the predetermined guidance line based on the stored correction value.

19 Claims, 15 Drawing Sheets

(56) References Cited

U.S. PATENT DOCUMENTS

| | | | |
|---|---|---|---|
| 4,726,175 | A | 2/1988 | Day et al. |
| 4,883,128 | A | 11/1989 | O'Neall et al. |
| 4,967,362 | A | 10/1990 | Schutten et al. |
| 5,203,148 | A | 4/1993 | Schreiner et al. |
| 5,694,751 | A | 12/1997 | Behnke |
| 6,079,192 | A | 6/2000 | Rasmussen |
| 6,553,925 | B1 | 4/2003 | Beaujot |
| 6,760,654 | B2 | 7/2004 | Beck |
| 6,901,731 | B2 | 6/2005 | Scott et al. |
| 7,055,616 | B1 | 6/2006 | Kiel |
| 7,103,457 | B2 * | 9/2006 | Dean .................. A01D 34/008 318/568.12 |
| 7,689,356 | B2 | 3/2010 | Dix et al. |
| 7,715,979 | B2 | 5/2010 | Dix |
| 8,010,261 | B2 | 8/2011 | Brubaker |
| 8,060,269 | B2 | 11/2011 | Dix |
| 9,288,938 | B2 | 3/2016 | Cavender-Bares et al. |
| 9,301,446 | B2 | 4/2016 | Peters et al. |
| 2009/0282794 | A1 | 11/2009 | Wilcox et al. |
| 2011/0118926 | A1 | 5/2011 | Peake et al. |
| 2011/0160961 | A1 * | 6/2011 | Wollenhaupt ...... A01D 41/1278 701/41 |
| 2015/0334919 | A1 | 11/2015 | Schleicher |
| 2015/0334920 | A1 | 11/2015 | Schleicher et al. |
| 2016/0330907 | A1 | 11/2016 | Anderson et al. |
| 2019/0133023 | A1 * | 5/2019 | Iwami .................... B62D 6/02 |

FOREIGN PATENT DOCUMENTS

| | | |
|---|---|---|
| JP | H11266607 A | 10/1999 |
| SU | 1142019 A1 | 2/1985 |

\* cited by examiner

SYSTEM AND METHOD FOR STEERING AN AGRICULTURAL HARVESTER

FIELD

The present disclosure generally relates to agricultural harvesters and, more particularly, to systems and methods for operating an agricultural harvester in one or more operating modes as the harvester is traveling across a field.

BACKGROUND

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

Many crops, such as corn and soybeans, are planted in rows. As such, when the harvester is moved across the field, it is desirable that the direction of travel of the harvester be generally aligned with the orientation of the crop rows so as to maximize harvesting efficiency. In this regard, some harvesters include a sensor(s), such a GNSS-based sensor(s) or a contact-based sensor(s), configured to detect the orientation of the harvester relative to the crop rows. However, such sensors have certain drawbacks. For example, GNSS-based sensors are subject to signal drift such that the actual location of the crop rows may deviate from the location detected by such sensors. Furthermore, when one or both of the adjacent crop rows are not present (e.g., when crop rows have fallen over), the data provided by contact-based sensors may be inaccurate.

Accordingly, an improved system and method for operating an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for operating an agricultural harvester. The system may include a harvesting implement including a plurality of row dividers and a sensor assembly mounted on a first row divider of the plurality of row dividers. The sensor assembly may be configured to detect a parameter indicative of an operating line of the harvester. The system may also include a controller communicatively coupled to the sensor assembly. The controller may be configured to monitor the operating line of the harvester based on measurement signals received from the sensor assembly when the harvester is operated in a first operating mode. The controller may also be configured to determine a differential between the operating line and a predetermined guidance line of the harvester. Furthermore, the controller may be configured to update a stored correction value based on the determined differential. Additionally, when the harvester is switched from the first operating mode to a second operating mode, the controller may be configured to adjust a location of the predetermined guidance line based on the stored correction value.

In another aspect, the present subject matter is directed to a method for operating an agricultural harvester. The harvester may include a harvesting implement having a plurality of row dividers. When the harvester is operated in a first operating mode, the method may include monitoring, with a computing device, an operating line of the harvester based on measurement signals received from a sensor assembly mounted on a first row divider of the plurality of row dividers. The method may also include determining, with the computing device, a differential between the operating line and a predetermined guidance line of the harvester. Furthermore, the method may include updating, with the computing device, a stored correction value based on the determined differential. Additionally, when the harvester is switched from the first operating mode to a second operating mode, the method may include adjusting, with the computing device, a location of the predetermined guidance line based on the stored correction value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
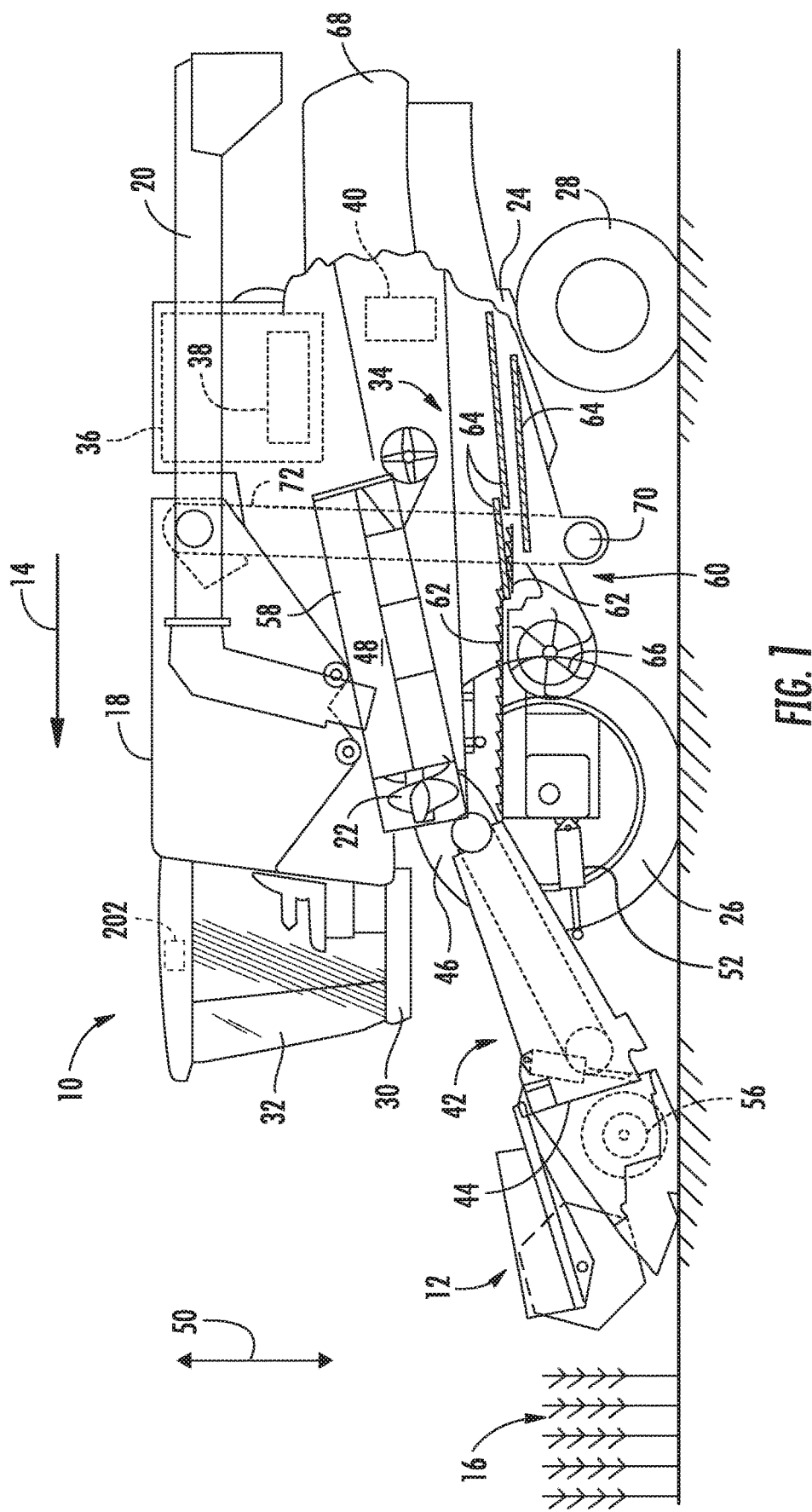
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for operating an agricultural harvester. Specifically, in several embodiments, a controller of the disclosed system may be configured to operate the harvester in either a first operating mode or in a second operating mode. For example, when the harvester is in the first operating mode, the controller may be configured to control the direction of travel of the harvester based on measurement signals received from a contact-based sensor assembly mounted on a row divider or "cone" of the harvester. Furthermore, when the harvester is in the second operating mode, the controller may be configured to control the direction of travel of the harvester based on data received from a location sensor, such as a GNSS-based sensor.

In accordance with aspects of the present subject matter, the controller may be configured to switch from the first operating mode to the second operating mode based on the measurement signals received from the contact-based sensor assembly. In general, the sensor assembly may include one or more components that allow for the sensor assembly to detect when one or more crop rows are absent within the portion of the field across which the harvester is traveling (e.g., the harvester is travelling across a headlands or the crops have fallen down). For example, in one embodiment, the sensor assembly may be mounted on a row divider of the harvester and include first and second arms that are biased outwardly in opposite directions from the centerline of the row divider. Moreover, the sensor assembly may include first and second sensing devices configured to detect a parameter indicative of the distance between the arms, with such distance generally being indicative of the lateral distance between the crop rows on either side of the row divider. As the harvester is moved across the field, the crop rows on either side of the row divider may contact the arms, thereby pushing the arms inward toward the row divider centerline. When one or both crops rows are absent, the corresponding arm(s) may pivot outwardly such that distance between the arms is greater than a predetermined distance threshold. When the distance between the arms exceeds the predetermined distance threshold, the controller may be configured to switch the harvester to the second operating mode such that the controller uses data from the location sensor to guide the harvester. It should be appreciated that the crop rows may straight or curved (e.g., in order to efficiently plant along curved boundaries, such as waterways, or on terraces).

Furthermore, in several embodiments, the controller may be configured to adjust the location of a predetermined guidance line that the harvester follows while in the second operating mode based on the measurement signals received from the sensor assembly. In general, the predetermined guidance line may correspond to a desired path across the field determined based on location sensor data or previously captured field data. Specifically, in one embodiment, the controller may be configured to monitor an operating line or actual path on which the harvester is moved across the field while the harvester is operating in the first operating mode. The controller may then be configured to determine a differential between the operating line and the predetermined guidance line (e.g., a lateral offset therebetween). Thereafter, the controller may be configured to create or update a stored correction value based on the determined differential. When the harvester is switched from the first operating mode to a second operating mode, the controller may be configured to adjust the location of the predetermined guidance line based on the stored correction value such that the predetermined guidance line corresponds to the operating line of the harvester while in the first operating mode.

Figure 2:
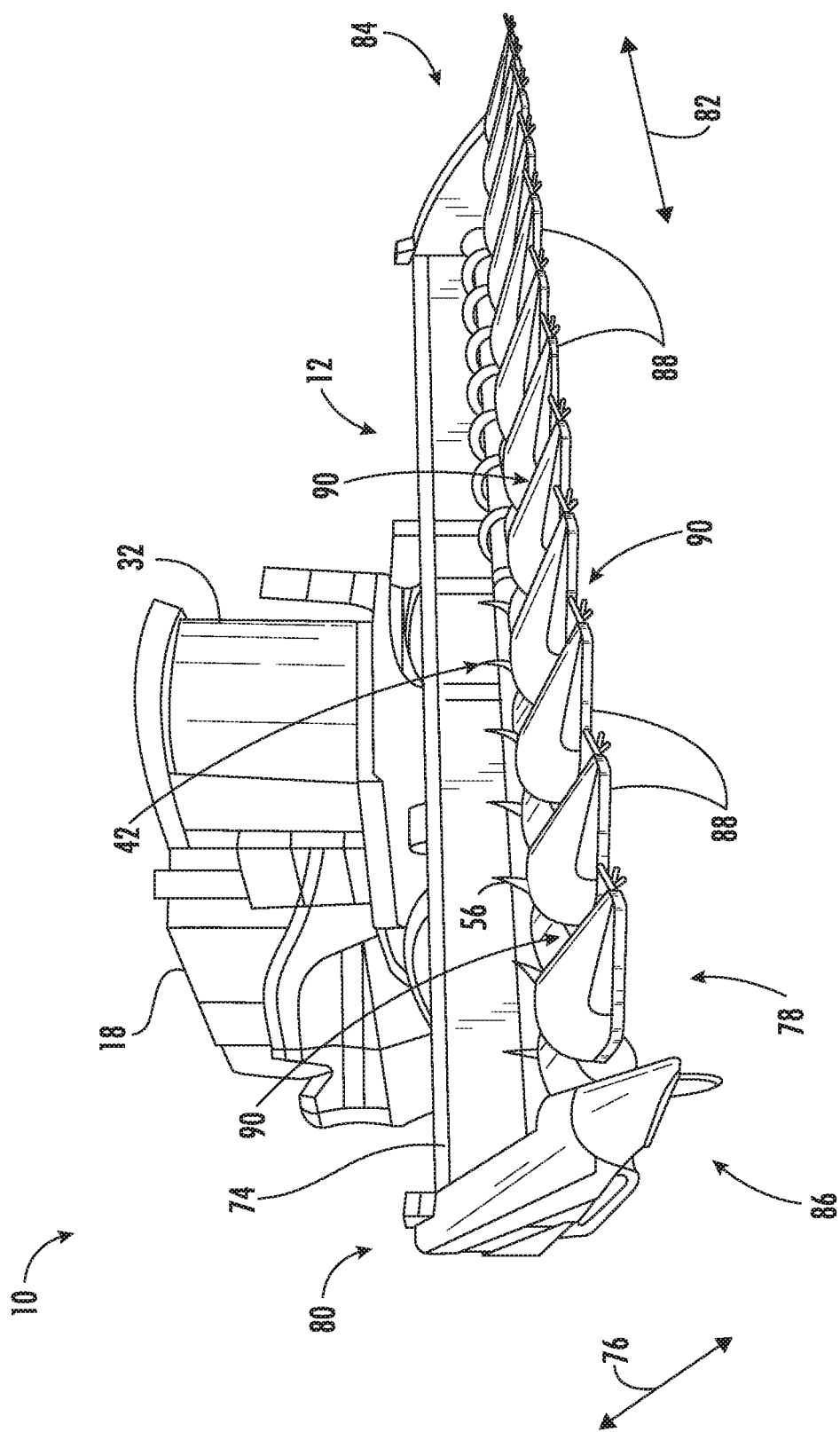
FIG. 2 illustrates a perspective view of the harvester shown in FIG. 1, particularly illustrating a header of the harvester in accordance with aspects of the present subject matter.

Referring now to the drawings, FIGS. 1 and 2 illustrate differing views of one embodiment of an agricultural harvester 10 in accordance with aspects of the present subject matter. Specifically, FIG. 1 illustrates a partial sectional side view of the agricultural harvester 10. Additionally, FIG. 2 illustrates a perspective view of the harvester 10, particularly illustrating a harvesting implement (e.g., a header 12) of the harvester 10.

In general, the harvester 10 may be configured to move across a field in a forward direction of travel (e.g., as indicated by arrow 14) to harvest a standing crop 16. While traversing the field, the harvester 10 may be configured to process the harvested crop and store the harvested crop within a crop tank 18 of the harvester 10. Furthermore, the harvested crop may be unloaded from the crop tank 18 for receipt by the crop receiving vehicle (not shown) via a crop discharge tube 20 of the harvester 10.

As shown in FIG. 1, in one embodiment, the harvester 10 may be configured as an axial-flow type combine, wherein the harvested crop is threshed and separated while it is advanced by and along a longitudinally arranged rotor 22. However, it should be appreciated that, in alternative embodiments, the harvester 10 may have any other suitable harvester configuration.

The harvester 10 may include a chassis or main frame 24 configured to support and/or couple to various components of the harvester 10. For example, in several embodiments, the harvester 10 may include a pair of driven, ground-engaging front wheels 26 and a pair of steerable rear wheels 28 that are coupled to the frame 24. As such, the wheels 26, 28 may be configured to support the harvester 10 relative to the ground and move the harvester 10 in the forward direction of travel 14. Furthermore, the harvester 10 may include an operator's platform 30 having an operator's cab 32, a crop processing system 34, the crop tank 18, and the crop discharge tube 20 that are supported by the frame 24. As will be described below, the crop processing system 34 may be configured to perform various processing operations on the harvested crop as the crop processing system 34 operates to transfer the harvested crop between header 12 of the harvester 10 and the crop tank 18. Furthermore, the harvester 10 may include an engine 36 and a transmission 38 mounted on the frame 24. The transmission 38 may be operably coupled to the engine 36 and may provide variably adjusted gear ratios for transferring engine power to the wheels 26 via a drive axle assembly (or via axles if multiple drive axles are employed). Additionally, the harvester 10 may include a steering actuator 40 configured to adjust the orientation of the steerable wheels 28 relative to the frame 24. For example, the steering actuator 40 may correspond to an electric motor, a linear actuator, a hydraulic cylinder, a pneumatic cylinder, or any other suitable actuator coupled to suitable mechanical assembly, such as a rack and pinion or a worm gear assembly.

Moreover, as shown in FIG. 1, the header 12 and an associated feeder 42 of the crop processing system 34 may extend forward of the frame 24 and may be pivotally secured thereto for generally vertical movement. In general, the feeder 42 may be configured to serve as support structure for the header 12. As shown in FIG. 1, the feeder 42 may extend between a front end 44 coupled to the header 12 and a rear end 46 positioned adjacent to a threshing and separating assembly 48 of the crop processing system 34. As is generally understood, the rear end 46 of the feeder 42 may be pivotally coupled to a portion of the harvester 10 to allow the front end 44 of the feeder 42 and, thus, the header 12 to be moved upward and downward along a vertical direction (e.g., as indicated by arrow 50) relative to the ground to set the desired harvesting or cutting height for the header 12. For example, as shown, in one embodiment, the harvester 10 may include a header actuator 52 configured to adjust the height of the header 12 relative to the ground. As such, the header actuator 52 may correspond to a fluid-driven actuator, such as a hydraulic or pneumatic cylinder, an electric linear actuator, or any other type of suitable actuator.

As the harvester 10 is propelled forwardly over the field with the standing crop 16, the crop material is severed from the stubble by a plurality of snapping rolls (not shown) and associated stripping plates (not shown) at the front of the header 12 and delivered by a header auger 56 to the front end 44 of the feeder 42, which supplies the harvested crop to the threshing and separating assembly 48. As is generally understood, the threshing and separating assembly 48 may include a cylindrical chamber 58 in which the rotor 22 is rotated to thresh and separate the harvested crop received therein. That is, the harvested crop is rubbed and beaten between the rotor 22 and the inner surfaces of the chamber 58, whereby the grain, seed, or the like, is loosened and separated from the straw.

The harvested crop 16 that has been separated by the threshing and separating assembly 48 may fall onto a crop cleaning assembly 60 of the crop processing system 34. In general, the crop cleaning assembly 60 may include a series of pans 62 and associated sieves 64. As is generally understood, the separated harvested crop 16 may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop 16. For instance, the fan 66 may blow the impurities off of the harvested crop 16 for discharge from the harvester 10 through the outlet of a straw hood 68 positioned at the back end of the harvester 10. The cleaned harvested crop 16 passing through the sieves 64 may then fall into a trough of an auger 70, which may be configured to transfer the harvested crop 16 to an elevator 72 for delivery to the crop tank 18.

Additionally, as shown in FIG. 1, in several embodiments, the harvester 10 may include a location sensor 202 configured to detect a parameter associated with a geographical or physical location of the harvester 10 within the field. For instance, in one embodiment, the location sensor 202 may include to a GPS receiver configured to detect the GPS coordinates or other GPS data of the harvester 10. However, it should be appreciated that, in alternative embodiments, the location sensor 202 may correspond to any other suitable type of GNSS-based sensor or other location sensor. Furthermore, although the location sensor 202 is illustrated as being positioned adjacent to the operator's cab 32 in FIG. 1, it should be appreciated that the location sensor 202 may be positioned at any other suitable location on or within the harvester 10. Moreover, the location sensor 202 may also include an inertial measurement unit (IMU). For example, in one embodiment, the IMU may include three perpendicular accelerometers and three perpendicular yaw rate sensors. As such, the IMU may allow for correction of the GPS position data for roll and/or tilt of the harvester 10 and translation of the GPS position data from an antenna of the GPS receiver to the ground. Furthermore, data from the IMU and the GPS receiver may be used to determine the heading of the harvester 10. For example, in one embodiment, the heading may be determined based on the DPS position data over time and the IMU data. In another embodiment, the heading may be determined based on the history of the locations of the harvester 10 as sensed by the location sensor 102. However, the heading or direction of travel of the harvester 10 may be determined in any other suitable manner.

Referring now to FIG. 2, the header 12 may include a header frame 74. In general, the frame 74 may extend along a longitudinal direction 76 between a forward end 78 and an aft end 80. The frame 74 may also extend along a lateral direction 82 between a first side 84 and a second side 86. In this respect, the frame 74 may be configured to support or couple to a plurality of components of the header 12. For example, a plurality of cones or row dividers 88 and the header auger 56 may be supported by the header frame 74. Additionally, the snapping rolls (not shown) and associated stripping plates (not shown) may also be supported on and coupled to the frame 74.

In several embodiments, as shown in FIG. 2, the header 12 may be configured as a corn header. In such embodiments, the plurality of row dividers 88 may extend forward from the header frame 74 along the longitudinal direction 76. Moreover, the row dividers 88 may be spaced apart along the lateral direction 82 of the header frame 74, with each adjacent pair of row dividers 88 defining an associated stalkway or recess 90 therebetween. As the harvester 10 is moved across the field, the row dividers 88 separate the stalks of the crop such that the separated stalks are guided into the stalkways 90. Thereafter, as is generally understood, the snapping rolls (not shown) pull the stalks downwardly onto the associated stripping plates (not shown) such that the ears of the standing crop 16 are snapped from the associated stalks upon contact with the stripping plates. The auger 56 may then convey the harvested ears to the feeder 42 for subsequent processing by the crop processing system 34 (FIG. 1). However, it should be appreciated that, in alternative embodiments, the header 12 may be configured as any other suitable type of harvesting implement.

It should be further be appreciated that the configurations of the harvester 10 and the header 12 described above and shown in FIGS. 1 and 2 are provided only to place the present subject matter in an exemplary field of use. Thus, it should be appreciated that the present subject matter may be readily adaptable to any manner of harvester and/or header configuration.

Figure 3:
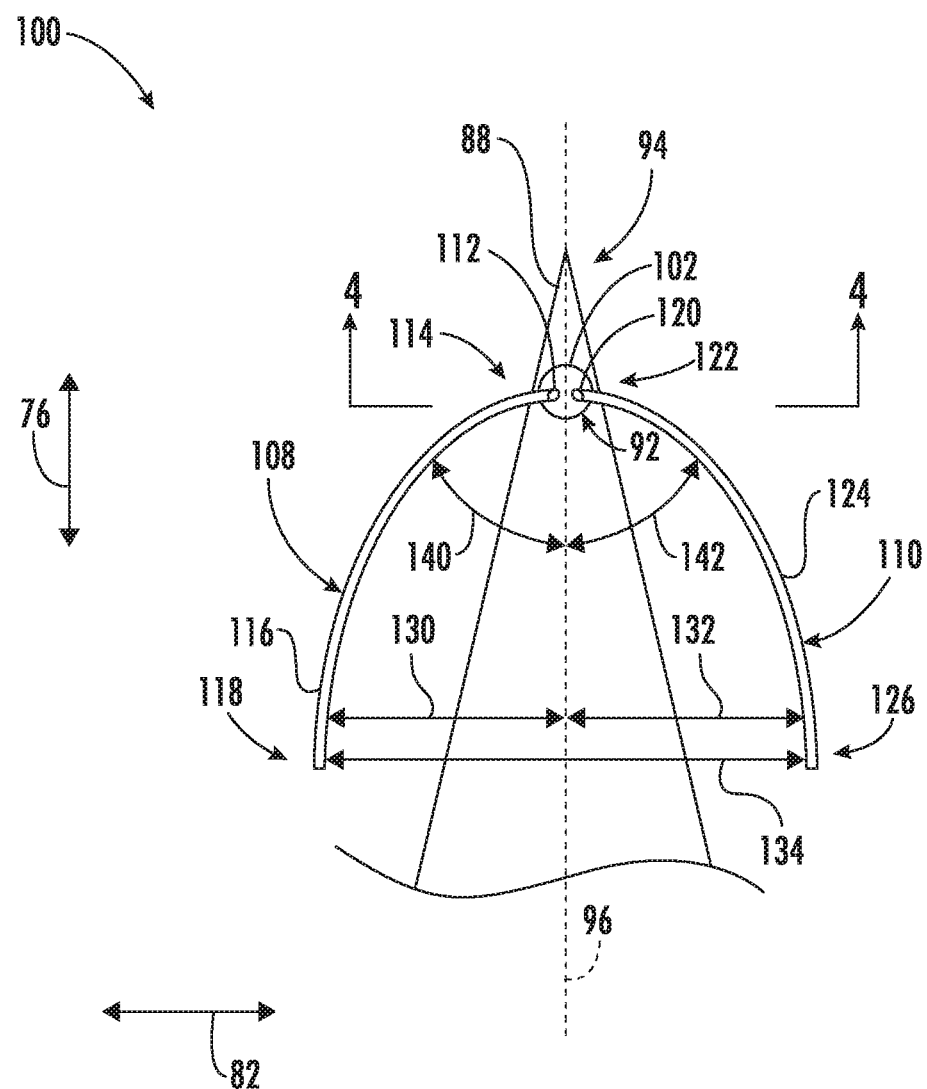
FIG. 3 illustrates a top view of one embodiment of a sensor assembly suitable for use on the harvester shown in FIGS. 1 and 2 in accordance with aspects of the present subject matter, particularly illustrating the sensor assembly being mounted to a row divider of the header.
Figure 4:
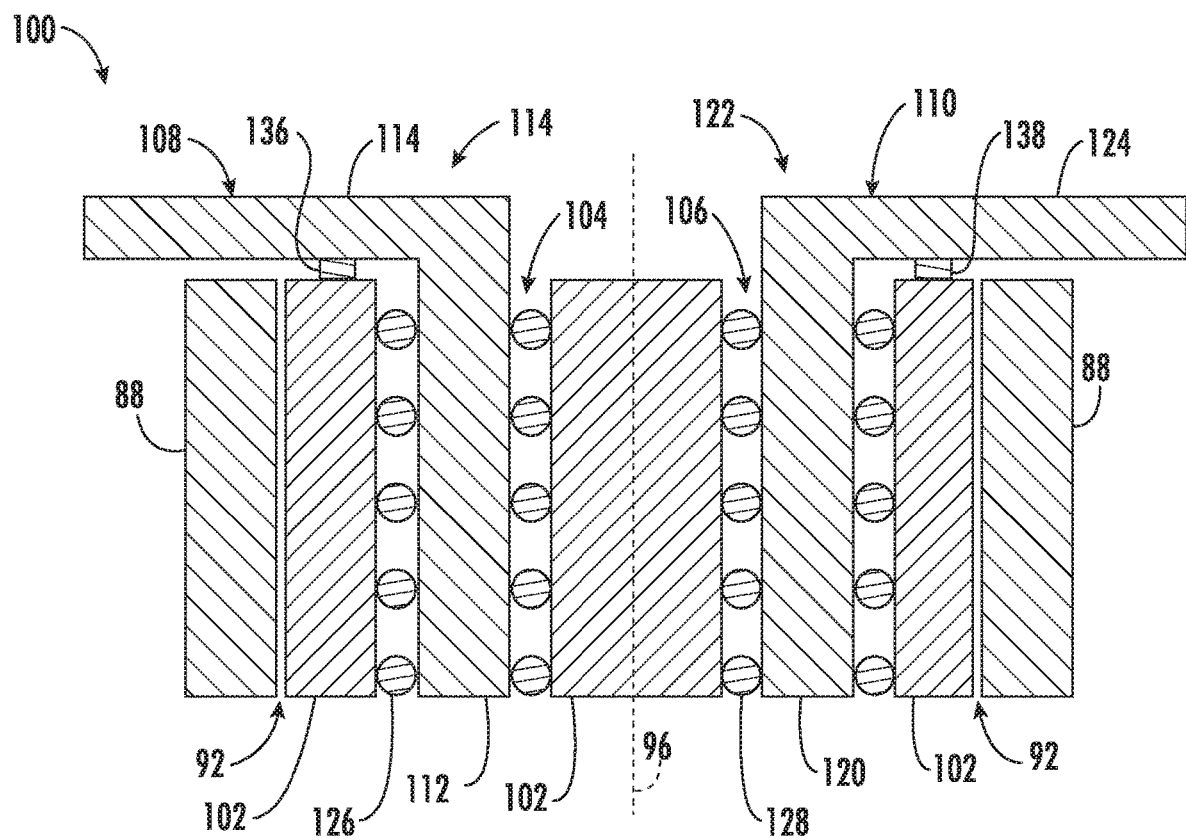
FIG. 4 illustrates a cross-sectional view of the sensor assembly shown in FIG. 3 taken about line 4-4, particularly illustrating one embodiment of first and second sensing devices of the sensor assembly in accordance with aspects of the present subject matter.

Referring now to FIGS. 3 and 4, differing views of one embodiment of a sensor assembly 100 for use on a harvesting implement of an agricultural harvester is illustrated in accordance with aspects of the present subject matter. Specifically, FIG. 3 illustrates a top view of the sensor assembly 100. Additionally, FIG. 4 illustrates a cross-sectional view of the sensor assembly 100 shown in FIG. 3 taken generally about line 4-4. In general, the sensor assembly 100 will be described herein with reference to the harvester 10 and the header 12 described above with reference to FIGS. 1 and 2. However, it should be appreciated by those of ordinary skill in the art that the disclosed sensor assembly 100 may generally be utilized with harvesters having any other suitable harvester configuration and/or harvesting implements having any other suitable implement configuration.

In several embodiments, single sensor assembly 100 is mounted on one of the row dividers 88 of the header 12 of the harvester 10. It should be appreciated that such sensor assembly 100 may be mounted on any row divider 88 of the header 12. Furthermore, it should be appreciated that, in alternative embodiments, any suitable number of sensor assemblies 100 may be mounted on the row dividers 88 of the header 12, such as by installing two or more sensor assemblies 100 on respective row dividers 88 of the header 12.

As shown in FIGS. 3 and 4, the sensor assembly 100 may generally include a base member 102 pivotably coupled to the row dividers 88 on which the sensor assembly 100 is mounted. For example, the base member 102 may be installed into an aperture 92 defined by the row divider 88 in a manner that permits the base member 102 to rotate within the aperture 92 relative to the row divider 88. In one embodiment, the aperture 92 may be defined at a forward end 94 of the row divider 88 and/or along a centerline 96 of the row divider 88. Furthermore, the base member 102 may define first and second apertures 104, 106 configured to receive first and second arms 108, 110 of the sensor assembly 100, respectively. However, it should be appreciated that, in alternative embodiments, the base member 102 may have any other suitable configuration.

The first and second arms 108, 110 of the sensor assembly 100 may be pivotally coupled to the base member 102. More specifically, the first arm 108 may include a first mounting portion 112 positioned at its proximal end 114, with the first mounting portion 112 being positioned within the aperture 104 in a manner that permits the first arm 108 to pivot relative to the base member 102. Furthermore, as shown in FIG. 3, the first arm 108 may include a first sensing portion 116 extending from its proximal end 114 outwardly along the lateral direction 82 from the row divider centerline 96 and rearwardly along the longitudinal direction 76 toward its distal end 118. Similarly, the second arm 110 may include a second mounting portion 120 positioned at its proximal end 122, with the second mounting portion 120 being positioned within the aperture 106 in a manner that permits the second arm 110 to pivot relative to the base member 102. Additionally, as shown in FIG. 3, the second arm 110 may include a second sensing portion 124 extending from its proximal end 122 outwardly along the lateral direction 82 from the row divider centerline 96 and rearwardly in the longitudinal direction 76 toward its distal end 126. As such, each arm 108, 110 may define a generally arcuate shape or profile. As shown, the arms 108, 110 may extend outwardly from the row divider centerline 96 in opposed directions. In this regard, as will be described below, the sensing portions 116, 124 may be configured to contact adjacent crop rows as the harvester 10 travels across the field. In one embodiment, the arms 108, 110 may generally be flexible (e.g., able to elastically deform upon contact with crops row). However, it should be appreciated that, in alternative embodiments, the first and second arms 108, 110 may have any other suitable configuration(s).

Additionally, as shown in FIG. 4, the sensor assembly 100 may include first and second biasing elements 126, 128 configured to bias the first and second arms 108, 110 outwardly relative to the row divider centerline 96. Specifically, in one embodiment, the first biasing element 126 may be positioned within the aperture 104 defined by the row divider 88. As such, the first biasing element 126 may be configured to bias the first arm 108 outwardly relative to the row divider centerline 96 such that a first distance (e.g., as indicated by arrow 130 in FIG. 3) is defined between the distal end 118 of the first arm 108 and the row divider centerline 96. Similarly, the second biasing element 128 may be positioned within the aperture 106 defined by the row divider 88. In this regard, the second biasing element 128 may be configured to bias the second arm 110 outwardly relative to the row divider centerline 96 such that a second distance (e.g., as indicated by arrow 132 in FIG. 3) is defined between the distal end 126 of the second arm 110 and the row divider centerline 96. As shown, the first and second distances 130, 132 may collectively define a total distance (e.g., as indicated by arrow 134 in FIG. 3) between the distal ends 118, 126 of the first and second arms 108, 110. In general, the total distance 134 when the arms 108, 110 are not in contact with a pair of crops rows may generally be greater than the nominal distance between such crops rows. It should be appreciated that there is a maximum total distance 134 to which the biasing elements 126, 128 may push the arms 108, 110 when no crops rows are present. Additionally, in one embodiment, the first and second biasing elements 126, 128 may be configured in a manner that provides sufficient biasing forces to topple weeds (i.e., contact with weeds does not pivot the arms 108, 110 relative to the base member 102). However, such biasing forces may be small enough such that the standing crop 16 is able to pivot the arms 108, 110 relative to the base member 102 without toppling. In the illustrated embodiment, the first and second biasing elements 126, 128 are configured as coil springs. However, it should be appreciated that the first and second biasing elements 126, 128 may be configured as any other suitable type of biasing elements.

As shown in FIG. 4, in several embodiments, the sensor assembly 100 may further include first and second sensing devices 136, 138 configured to detect first and second parameters indicative of the distance 134 defined between the arms 108, 110. For example, in one embodiment, the first sensing device 136 may be configured to detect a first pivot angle (e.g., as indicated by arrow 140 in FIG. 3) defined between the first arm 108 and the row divider centerline 96. Similarly, the second sensing device 138 may be configured to detect a second pivot angle (e.g., as indicated by arrow 142 in FIG. 3) defined between the second arm 110 and the row divider centerline 96. As will be described below, the distance 134 defined between the first and second arms 108, 110 may be determined based on the detected first and second angles 140, 142. In this regard, the first and second sensing devices 136, 138 may, for example, correspond to first and second potentiometers configured to monitor the pivotable movement of the first and second arms 108, 110 relative to the base member 102, respectively. However, it should be appreciated that, in alternative embodiments, the first and second sensing devices 136, 138 may correspond to any other suitable type of sensing devices and/or be configured to detect any suitable parameters indicative of the distance 134.

Figure 5:
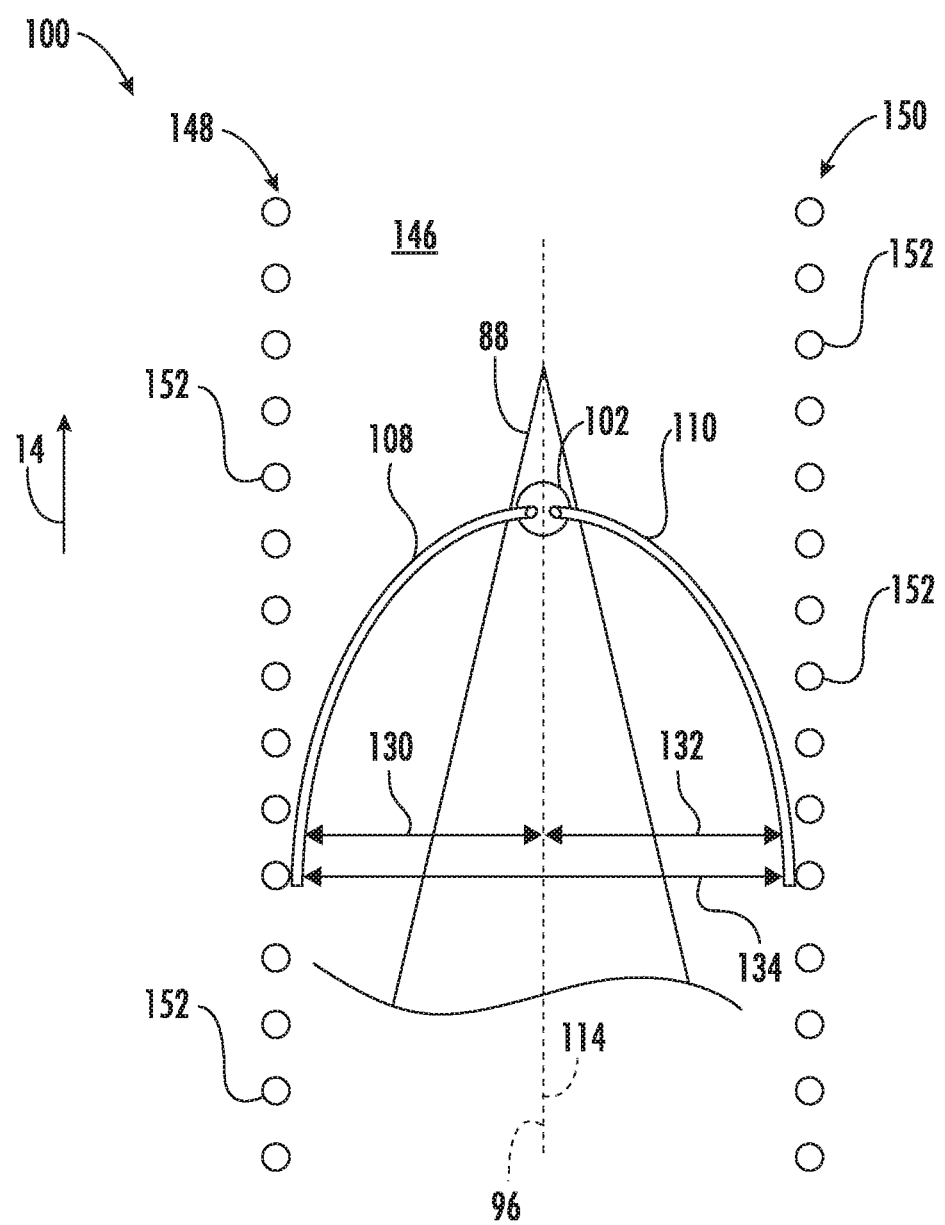
FIG. 5 illustrates a top view of the sensor assembly shown in FIGS. 3 and 4, particularly illustrating the position of first and second arms of the sensor assembly when the centerline of the row divider on which the sensor assembly is mounted is coincident with a centerline of an alley defined between a pair of adjacent crop rows and each arm is in contact with one of the crop rows in accordance with aspects of the present subject matter.

FIGS. 5-8 illustrate the positions of the first and second arms 108, 110 of the sensor assembly 100 in various instances as the harvester 10 travels across the field in the forward direction of travel 14. Referring to FIG. 5, the positions of the first and second arms 108, 110 are illustrated when the first arm 108 is in contact with a first row 148 of crops 152 within the field and the second arm 110 is in contact with an adjacent second row 150 of crops 152 within the field. Furthermore, as shown, the row divider centerline 96 is coincident with the centerline (e.g. as indicated by arrow 144 in FIG. 5) of an alley 146 defined between the crop rows 148, 150. In such instance, the harvester 10 may generally be travelling across the field in same the direction as the crop rows 148, 150 are oriented. As such, the distance 134 defined between the arms 108, 110 may generally correspond to the distance between the crops rows 148, 150 (e.g., the width of the alley 146). Furthermore, as shown, the first distance 130 defined between the first arm 108 and the row divider centerline 96 may generally be the same as the second distance 132 defined between the second arm 110 and the row divider centerline 96.

Figure 6:
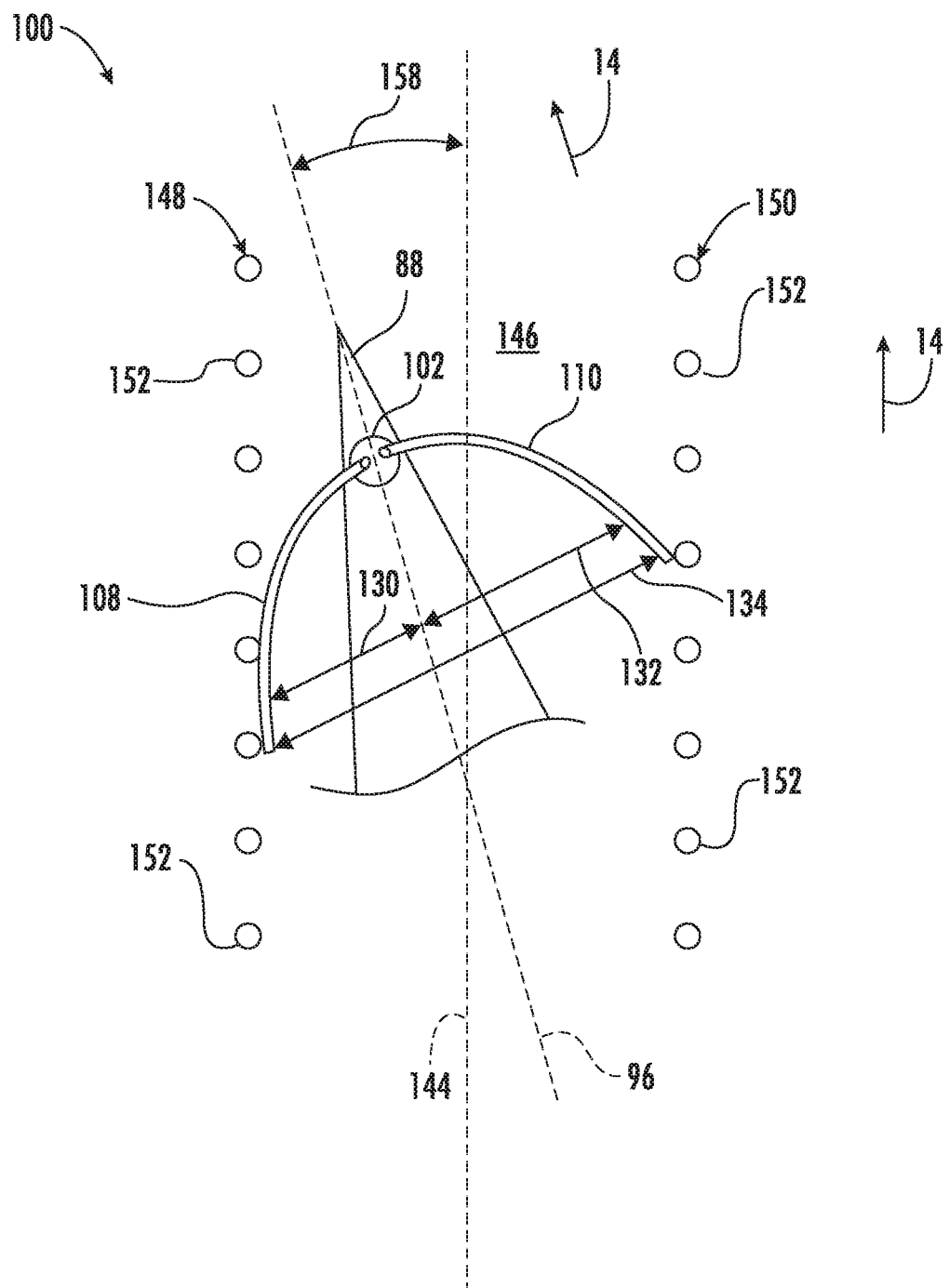
FIG. 6 illustrates a top view of the sensor assembly shown in FIGS. 3 and 4, particularly illustrating the position of the arms when the centerline of the row divider is oriented at an angle relative to the centerline of the alley and each arm is in contact with one of the crop rows in accordance with aspects of the present subject matter.

FIG. 6 illustrates the positions of the first and second arms 108, 110 when the first arm 108 is in contact with the first crop row 148 and the second arm 110 is in contact with the second crop row 150 similar to FIG. 5. However, unlike FIG. 5, the row divider centerline 96 is oriented at an angle (e.g., as indicated by arrow 158 in FIG. 6) with the alley centerline 144. In such instance, the harvester 10 may be travelling across the field in a different direction than the orientation of the crop rows 148, 150. Specifically, as shown in FIG. 6, the row divider 88 is oriented within the alley 146 such that the row divider 88 is moving toward the first crop row 148 and away from the second crop row 150. As such, the first distance 130 defined between the first arm 108 and the row divider centerline 96 is smaller than the second distance 132 defined between the second arm 110 and the row divider centerline 96. Additionally, since the centerline 96 of the row divider 88 is oriented at the angle 158 relative to the alley centerline 144, the base member 102 may pivot relative to the row divider 88, thereby rotating the sensor assembly 100 relative to the base member 88 (e.g., in the counterclockwise direction in FIG. 6). As such, the distance 134 defined between the arms 108, 110 may be greater than the width of the alley 146 (i.e., the distance 134 shown in FIG. 6 is greater than the distance 134 shown in FIG. 5). As will be described below, in such instances, the harvester 10 may be automatically steered in a manner that realigns the row divider centerline 88 with the alley centerline 144.

Figure 7:
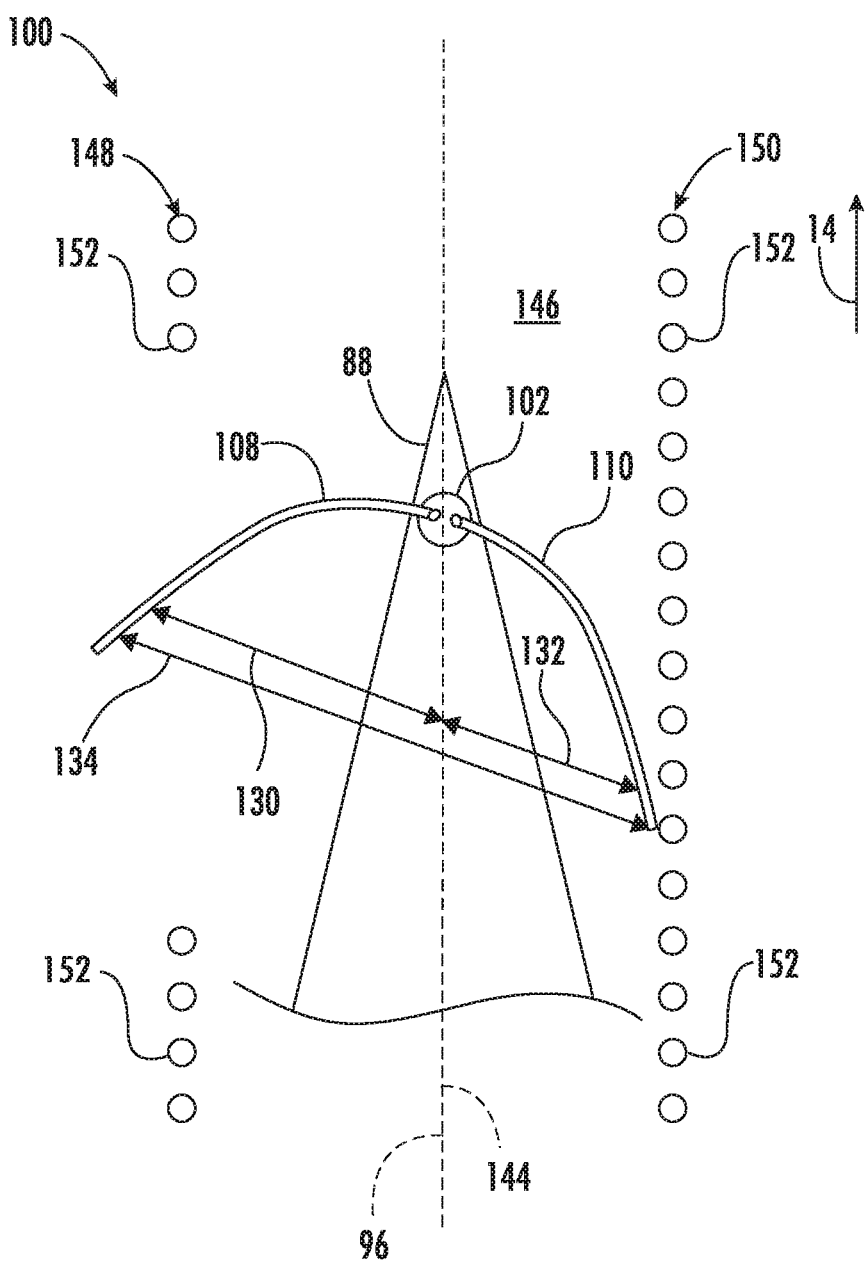
FIG. 7 illustrates a top view of the sensor assembly shown in FIGS. 3 and 4, particularly illustrating the position of the arms when the centerline of the row divider is coincident with the centerline of the alley and only one arm is in contact with one of the crop rows in accordance with aspects of the present subject matter.

Referring now to FIG. 7, the row divider centerline 96 is coincident with the alley centerline 144 and the second arm 110 is in contact with the second crop row 150 as shown in FIG. 5. However, unlike FIG. 5, the first arm 108 is not in contact with the first crop row 148. In such instance, the first arm 108 pivots outwardly from the row divider centerline 96 such that the first distance 130 corresponds to a maximum allowable distance between the first arm 108 and the centerline 96. Furthermore, in such instance, the sensor assembly 100 pivots relative to the associated row divider 88. In particular, the second crop row 150 exerts an inward force (e.g., toward row divider centerline 96) that is not countered by a similar force from the first crop row 148 (i.e., given that the crops 152 are absent), thereby causing the base member 102 to pivot relative to the row divider 88 (e.g., in the clockwise direction in FIG. 7). Moreover, since the sensor assembly 100 rotates relative to the row divider 88, the second distance 132 in FIG. 7 may be greater than the second distance in FIG. 5. Additionally, it should be appreciated that the rotation of the sensor assembly 100 relative to the row divider 88 may be greater in the instance shown in FIG. 7 than in the instance shown in FIG. 6. Accordingly, the distance 134 shown in FIG. 7 may be greater than the distance 134 shown in FIG. 6.

Figure 8:
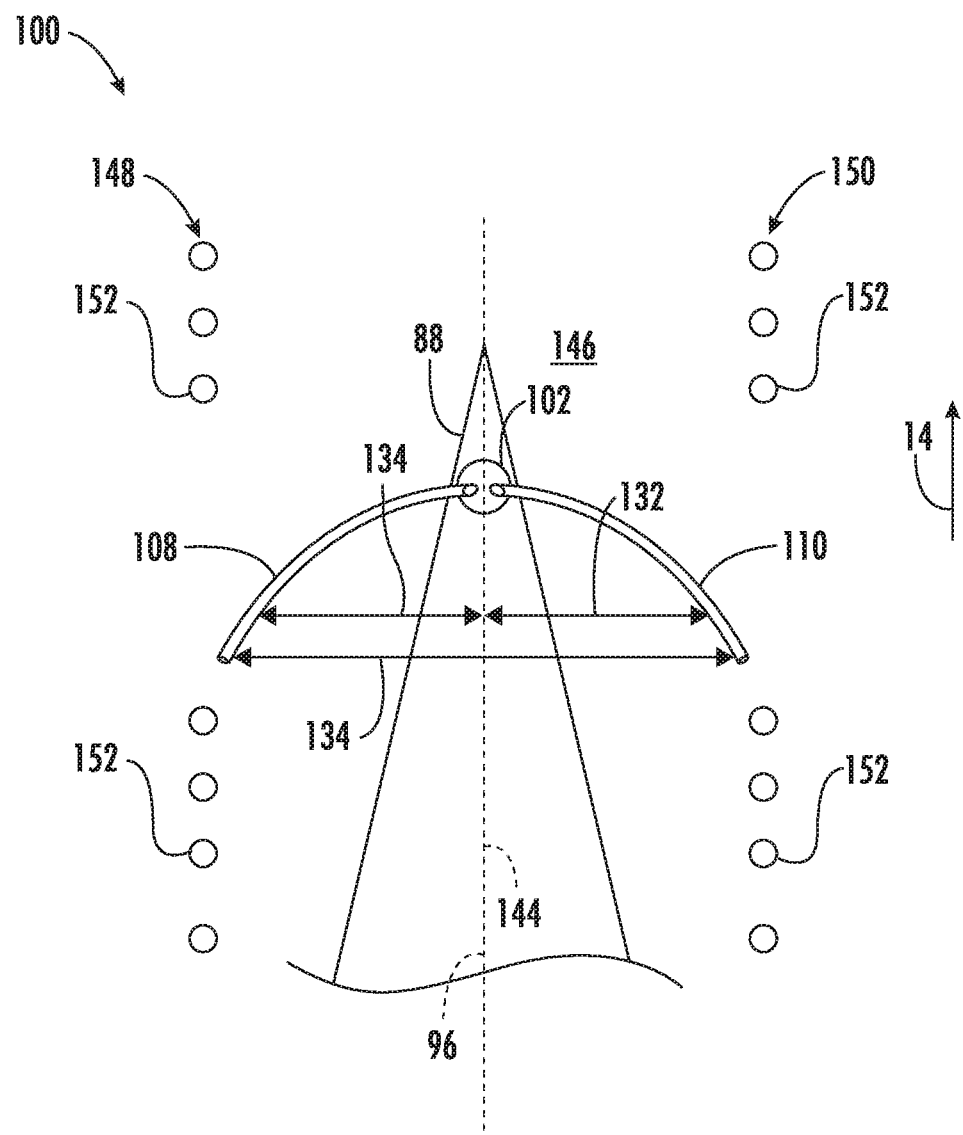
FIG. 8 illustrates a top view of the sensor assembly shown in FIGS. 3 and 4, particularly illustrating the position of the arms when the centerline of the row divider is coincident with the centerline of the alley and neither arm is in contact with one of the crop rows in accordance with aspects of the present subject matter.

As shown in FIG. 8, the row divider centerline 96 is coincident with the alley centerline 144 as shown in FIGS. 5 and 7. However, unlike FIGS. 5 and 7, neither arm 108, 110 is in contact with an adjacent crop row 148, 150. In such instance, the first arm 108 may pivot outwardly from the row divider centerline 96 such that the first distance 130 corresponds to a maximum allowable distance between the first arm 108 and the centerline 96. Similarly, the second arm 110 may pivot outwardly from the row divider centerline 96 such that the maximum second distance 132 corresponds to a maximum allowable distance between the second arm 110 and the centerline 96. As such, the distance 134 defined between the first and second arms 108, 110 may be at its greatest in the instance shown in FIG. 8. Furthermore, in such instance, the first and second distances 130, 132 are generally the same. Additionally, unlike the instance in FIG. 7, the sensor assembly 100 may not rotate relative to the row divider 88 in the instance shown in FIG. 8.

Figure 9:
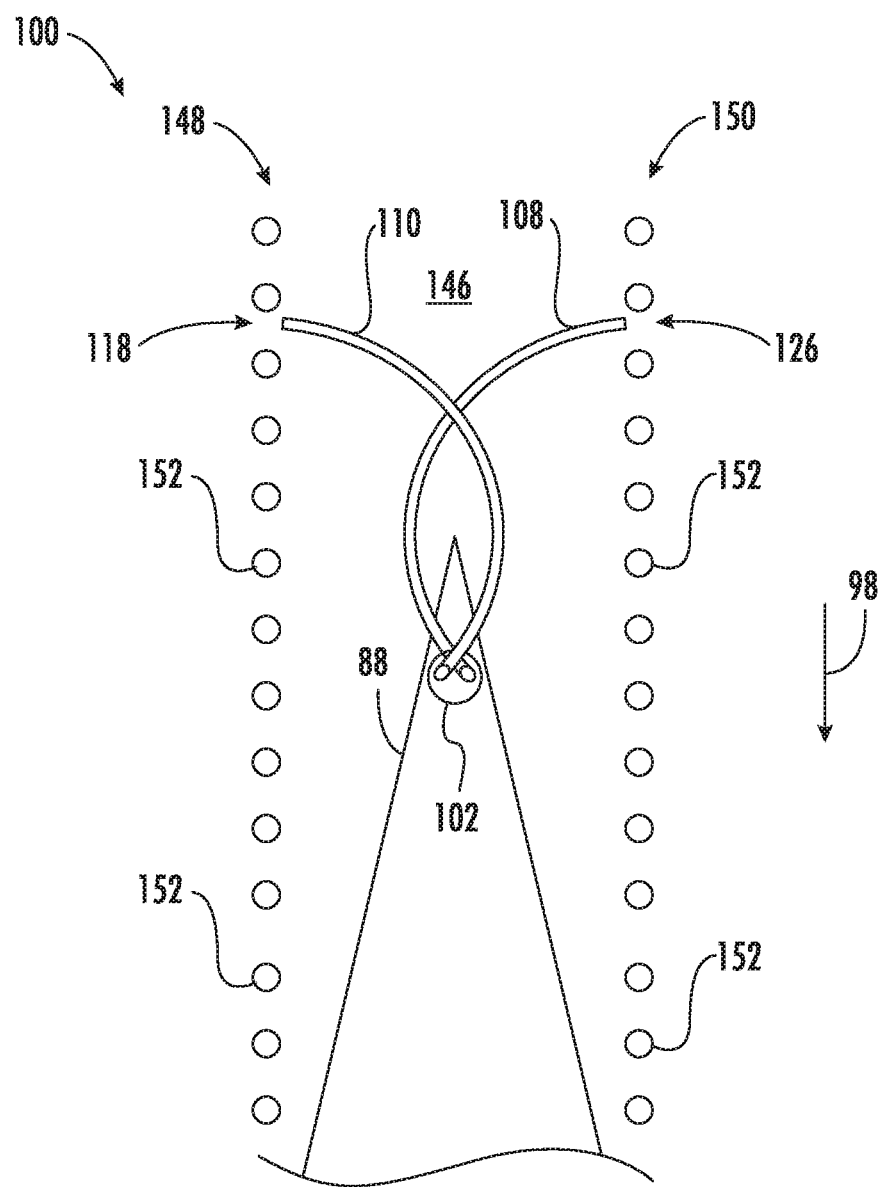
FIG. 9 illustrates a top view of the sensor assembly shown in FIGS. 3 and 4, particularly illustrating the position of the arms when the harvester is moved in a reverse direction of travel in accordance with aspects of the present subject matter.

Referring now to FIG. 9, the position of the arms 108, 110 is illustrated when the harvester 10 is moved in a reverse direction of travel 98. In general, the reverse direction of travel 98 is opposite of the forward direction of travel 14. Specifically, when moved in the reverse direction of travel 98, the wheels 26, 28 of the harvester 10 traverse a portion of the ground across which the harvester 10 travels before the header 12. As shown, in such instances, the arms 108, 110 may pivot forward (e.g., toward the forward end 78 of the header 12). That is, when the harvester 10 is traveling in the reverse direction 98, the distal ends 118, 126 of the arms 108, 100 may contact the crops 152, thereby causing rotation of the arms 108, 110 relative to the base member 102. Such movement may prevent the crops 152 from damaging the arms 108, 110. Additionally, the arms 108, 110 may pivot rearwardly to the position shown in FIGS. 5-8 when the harvester 10 is moved in the forward direction of travel 14.

Figure 10:
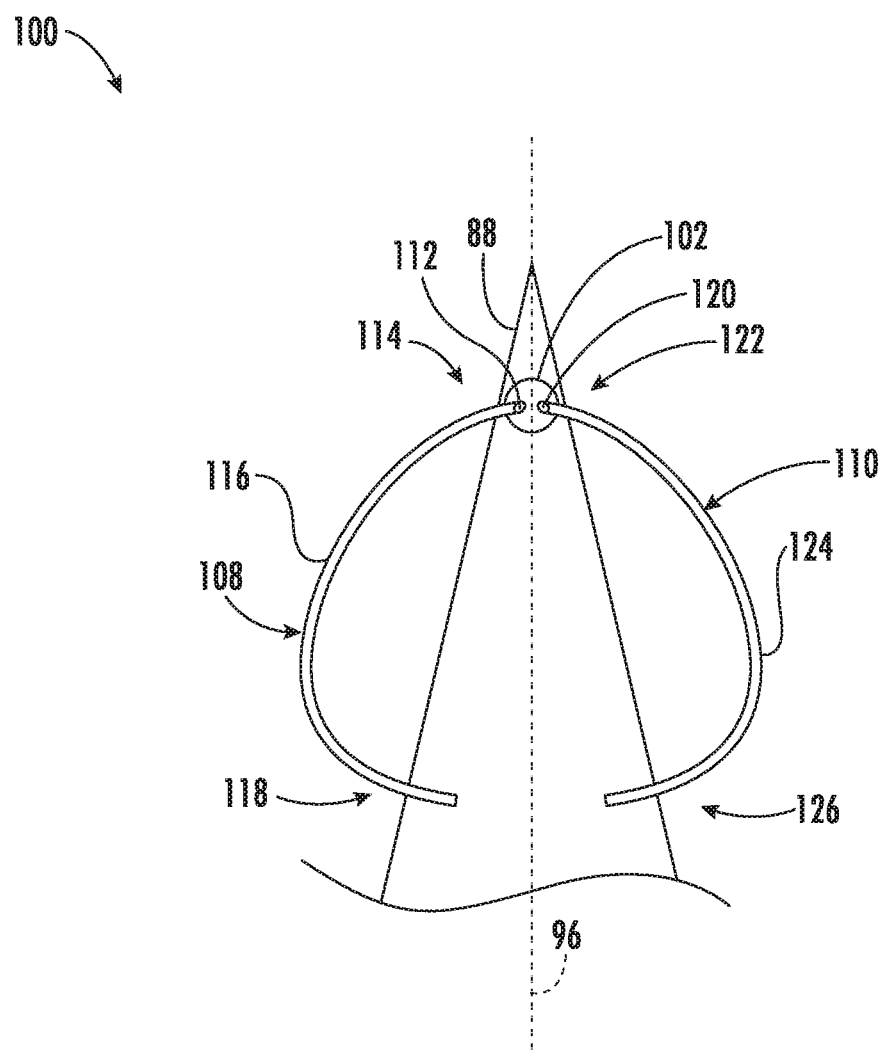
FIG. 10 illustrates a top view of another embodiment of a sensor assembly for use on the harvester shown in FIGS. 1 and 2 in accordance with aspects of the present subject matter, particularly illustrating a different configuration for the first and second arms of the sensor assembly.

Referring now to FIG. 10, a top view of another embodiment of the sensor assembly 100 described above with reference to FIGS. 3-9 is illustrated in accordance with aspects of the present subject matter. As shown in FIG. 10, the sensor assembly 100 may generally be configured the same as or similar to that described above with reference to FIGS. 3-9. For instance, the sensor assembly 100 may include a first arm 108 having a first sensing portion 116 extending from its proximal end 114 to its distal end 118. Moreover, the sensor assembly 100 may include a second arm 110 having a second sensing portion 124 extending from its proximal end 122 to its distal end 126. However, as shown in FIG. 10, unlike the above-described embodiments, the distal ends 118, 126 may curve inwardly toward the associated row divider centerline 96. In such embodiment, the arms 108, 110 may not pivot forward in the manner shown in FIG. 9 when the harvester 10 is moved in the reverse direction of travel 98. However, it should be appreciated that, in alternative embodiments, the first and second arms 108, 110 may have any other suitable configuration.

Figure 11:
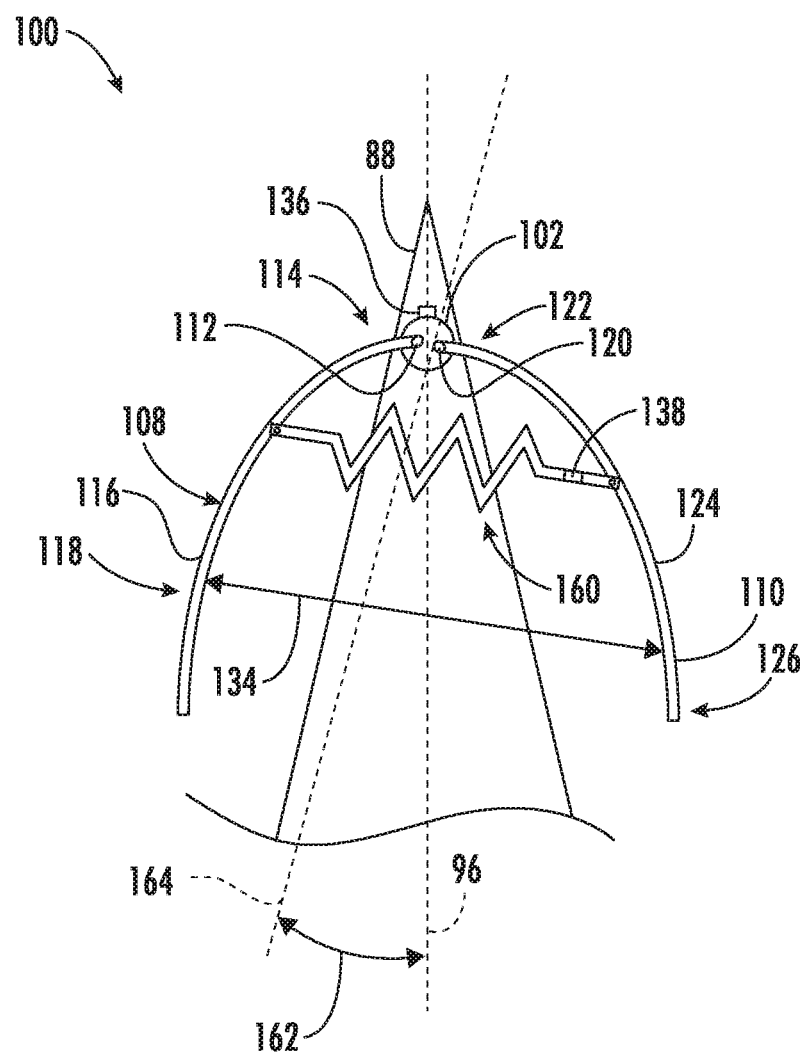
FIG. 11 illustrates a top view of a further embodiment of a sensor assembly for use on the harvester shown in FIGS. 1 and 2 in accordance with aspects of the present subject matter, particularly illustrating another embodiment of the first and second sensing devices of the sensor assembly.

Referring now to FIG. 11, a top view of a further embodiment of the sensor assembly 100 described above with reference to FIGS. 3-10 is illustrated in accordance with aspects of the present subject matter. As shown in FIG. 11, the sensor assembly 100 may generally be configured the same as or similar to that described above with reference to FIGS. 3-10. For instance, the sensor assembly 100 may include first and second arms 108, 110 pivotally coupled to a base member 102, with the base member 102, in turn, being pivotally coupled to an associated row divider 88. Moreover, the sensor assembly 100 may include first and second sensing devices 136, 138 configured to detect first and second parameters indicative of the distance 134 defined between the arms 108, 110. However, as shown in FIG. 11, unlike the above-described embodiments, a biasing element 160 may be coupled between the arms 108, 110 and configured to bias the arms 108, 110 outwardly relative to the row divider centerline 96. In the illustrated embodiment, the biasing element 160 is configured as a tension spring. It should be appreciated the there is a maximum total distance 134 to which the biasing elements 160 may push the arms 108, 110 outward when no crops rows are present. Furthermore, unlike the above-described embodiments, the first sensing device 136 may be configured to detect an angle (e.g., as indicated by arrow 162 in FIG. 11) defined between the row divider centerline 96 and a centerline 164 of the sensor assembly 100. That is, the first sensing device 136 may generally be configured to detect relative rotation between the base member 102 and the row divider 88. As such, in one embodiment, the first sensing device 136 may correspond to a potentiometer. Additionally, unlike the above described embodiments, the second sensing device 138 may be configured to detect the distance 134 defined between the arms 108, 110. In this regard, in one embodiment, the second sensing device 136 may correspond to a strain gauge provided in operative association with the biasing element 160. However, it should be appreciated that the first and second sensing devices 136, 138 may correspond to any other suitable types of sensing devices and/or configured to detect any other suitable parameters. Furthermore, it should be appreciated that the biasing element 160 may be configured as any other suitable type of biasing element.

Figure 12:
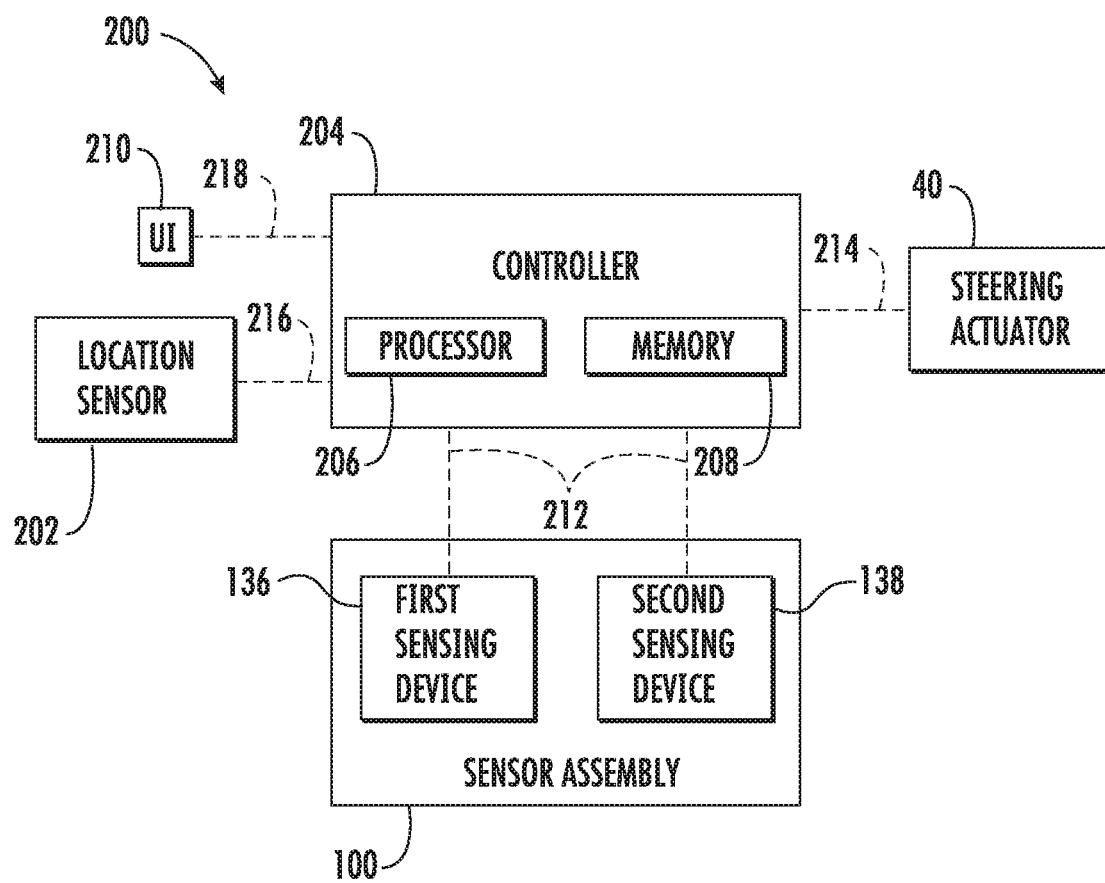
FIG. 12 illustrates a schematic view of one embodiment of a system for operating an agricultural harvester in accordance with aspects of the present subject matter.

Referring now to FIG. 12, a schematic view of one embodiment of a system 200 for operating an agricultural harvester is illustrated in accordance with aspects of the present subject matter. In general, the system 200 will be described herein with reference to the harvester 10 and the sensor assembly 100 described above with reference to FIGS. 1-11. However, it should be appreciated by those of ordinary skill in the art that the disclosed system 200 may generally be utilized with harvesters having any other suitable harvester configuration and/or sensor assemblies having any other suitable assembly configuration.

As shown in FIG. 12, the system 200 may include one or more controllers 204 positioned on and/or within or otherwise associated with the harvester 10. In general, the harvester controller 204 may comprise any suitable processor-based device known in the art, such as a computing device or any suitable combination of computing devices. Thus, in several embodiments, the controller 204 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 of the controller 204 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 208 may generally be configured to store suitable computer-readable instructions that, when implemented by the processor(s) 206, configure the controller 204 to perform various computer-implemented functions, such as one or more aspects of the methods 300 and/or 400 described below with reference to FIGS. 14 and 15. In addition, the controller 204 may also include various other suitable components, such as a communications circuit or module, one or more input/output channels, a data/control bus and/or the like.

It should be appreciated that the controller 204 may correspond to an existing controller the harvester 10, itself, or the controller 204 may correspond to a separate processing device. For instance, in one embodiment, the controller 204 may form all or part of a separate plug-in module that may be installed in association with the harvester 10 to allow for the disclosed systems and methods to be implemented without requiring additional software to be uploaded onto existing control devices of the harvester 10. It should also be appreciated that the functions of the controller 204 may be performed by a single processor-based device or may be distributed across any number of processor-based devices, in which instance such devices may be considered to form part of the controller 204.

Furthermore, in one embodiment, the system 100 may also include a user interface 210 of the harvester 10. Specifically, the user interface 210 may be communicatively coupled to the controller 204 via a wired or wireless connection to allow feedback signals (e.g., as indicated by dashed line 218 in FIG. 12) to be transmitted from the controller 204 to the user interface 210. As such, the user interface 210 may be configured to receive an input from an operator of the harvester 10, such as an input associated with the direction of travel 14 of the harvester 10. The user interface 210 may also include one or more input devices (not shown), such as touchscreens, keypads, touchpads, knobs, buttons, sliders, switches, mice, microphones, and/or the like, which are configured to receive user inputs from the operator. In addition, in some embodiments, the user interface 210 may include one or more feedback devices (not shown), such as display screens, speakers, warning lights, and/or the like, which are configured to communicate feedback, such as feedback from the controller 204, to the operator of the harvester 10. However, in alternative embodiments, the user interface 130 may have any other suitable configuration.

In several embodiments, the controller 204 may be configured to operate the harvester 10 in a first operating mode. Specifically, as shown in FIG. 12, the controller 204 may be communicatively coupled to the sensor assembly 100, and, more specifically, the first and second sensing devices 136, 138 of the sensor assembly 100, via a wired or wireless connection to allow measurement signals (e.g., indicated by dashed lines 212 in FIG. 12) to be transmitted from the sensing devices 136, 138 to the controller 204. Furthermore, the controller 204 may be communicatively coupled to the steering actuator 40 of the harvester 10 via a wired or wireless connection to allow control signals (e.g., indicated by dashed line 214 in FIG. 12) to be transmitted from the controller 204 to the steering actuator 40. In this regard, when the harvester 10 is operating within the first operating mode, the controller 204 may be configured to control the forward direction of travel 14 of the harvester 10 based on the measurement signals 212 received from the first and second sensing devices 136, 138. For example, the controller 204 may be configured to initiate steering of the harvester 10 so as to adjust the forward direction of travel 14 of the harvester 10 by transmitting control signals 214 to the steering actuator 40. It should be appreciated that, when the harvester 10 is in the first operating mode, the controller 204 may be configured to control the forward direction of travel 14 of the harvester 10 independent of any predetermined guidance lines associated with an auto-guidance or second operating mode of the harvester 10.

In one embodiment, the controller 204 may be configured to initiate a change in the forward direction of travel 14 when it is determined that the orientation of the sensor assembly 100 relative to the associated row divider 88 has fallen outside of a predetermined orientation range. As indicated above, the first and second sensing devices 136, 138 may be configured to detect first and second parameters indicative of the orientation of the sensor assembly 100 relative to the row divider 88. In this regard, the measurement signals 212 received from the first and second sensing devices 136, 138 may be indicative of the orientation of the sensor assembly 100. As such, the controller 204 may include a look-up table or suitable mathematical formula stored within its memory 208 that correlates the measurement signals 212 to the orientation of the sensor assembly 100. For example, in one embodiment, such measurement signals 212 may be indicative of the first distance 130 defined between the first arm 108 and the row divider centerline 96 and the second distance 132 defined between the second arm 110 and the centerline 96. When the first and second distances 130, 132 differ by more than a predetermined amount or threshold (thereby indicating that the forward direction of travel 14 differs from the direction of the crop rows, such as that shown in FIG. 6), the controller 204 may be configured to initiate steering of the harvester 10 (e.g., by transmitting suitable control signals 214 to the steering actuator 40) in a manner that aligns the forward direction of travel 14 of the harvester 10 with the direction of the crop rows.

Furthermore, in several embodiments, the controller 204 may be configured to operate the harvester 10 in a second operating mode. Specifically, as shown in FIG. 12, the controller 204 may be communicatively coupled to a location sensor 202 via a wired or wireless connection to allow location data (e.g., indicated by dashed line 216 in FIG. 12) to be transmitted from the location sensor 202 to the controller 204. In this regard, when the harvester 10 is operating within the second operating mode, the controller 204 may be configured to control the forward direction of travel 14 of the harvester 10 based on the location data 216 received from the location sensor 202.

In one embodiment, when the harvester 10 is in the second operating mode, the controller 204 may be configured to control the forward direction of travel 14 based on one or more predetermined guidance lines. In general, the predetermined guidance line(s) corresponds to a desired or optimal path(s) across the field as determined based on the location data 216 and/or stored field data. For example, when the harvester 10 is aligned with the crop rows (e.g., by manual adjustment of the direction of travel 14 by the operator of the harvester 10), the controller 204 may be configured to create or generate the predetermined guidance line(s), such as for each pass across the field, based on the detected location of the harvester 10 within the field. Alternatively, the predetermined guidance line(s) may be determined based on sensor data collected during a previous field operation (e.g., planting operation) and may be stored in the controller's memory 208. Such field data may be indicative of the locations of the crop rows. For example, such field data may include planting records indicative of the locations of the where seeds where planted. Moreover, such field data may include harvesting records (e.g., if an area of the field has been harvested, no crops are present). In one embodiment, there may be one predetermined guidance line corresponding to each pass of the harvester 10 across the field. Alternatively, there may be one predetermined guidance line corresponding to each alley within the field. As the harvester 10 is traveling across the field, the controller 204 may be configured to monitor the location of the harvester 10 based on the received location data 216. Thereafter, the controller 204 may be configured to compare the monitored location of the harvester 10 to the location of the predetermined guidance line(s). In the event that the differential between the location of the harvester 10 and the location of the predetermined guidance line(s) exceeds a predetermined differential threshold (thereby indicating that the harvester 10 deviated from the predetermined guidance line(s)) the controller 204 may be configured to initiate steering (e.g., by transmitting the control signals 214 to the steering actuator 40) of the harvester 10 in a manner that returns location of the harvester 10 to the predetermined guidance line(s). Additionally, such steering may be based on one or more other parameters, such as the current steering angle of the harvester 10 and the angle of the harvester 10 with respect to the swath, and/or the like, to improve steering accuracy. It should be appreciated that, in alternative embodiments, the controller 204 may be configured to initiate steering of the harvester 10 any time that the location of the harvester 10 deviates from the location of the predetermined guidance line(s). In such embodiments, the controller 204 may not compare differential between the location of the harvester 10 and the location of the predetermined guidance line(s) to any predetermined differential threshold or dead band range. Instead, such steering correction may be a continuous control process.

It should be appreciated that operating the harvester 10 in second operating mode provides various advantages. For example, when no crop is present, the harvester 10 may be automatically guided to a desired position between a pair crops before encountering such crop rows. Furthermore, once such desired position is found for one swath of the field, the desired positions between other pairs of crops rows for other swaths of the field may be determined based on the head width.

Moreover, in accordance with aspects of the present subject matter, the controller 204 may be configured to switch between the first and second operating modes of the harvester 10 based on the measurement signals 212 received from the first and second sensing devices 136, 138. Specifically, in several embodiments, when the harvester 10 is in the first operating mode, the controller 204 may be configured to monitor the distance 134 defined between the distal ends 118, 126 of the first and second arms 108, 110. Thereafter, the controller 204 may be configured to compare the monitored distance 134 to a predetermined distance threshold. In the event that the monitored distance 134 exceeds the predetermined distance threshold (thereby indicating that one or both of the arms 108, 110 are no longer in contact with crop rows, such as that shown in FIGS. 7 and 8), the controller 204 may be configured to switch the harvester 10 from the first operating mode to the second operating mode. Furthermore, in one embodiment, when the harvester 10 is in the second operating mode, the controller 204 may be configured to continue monitoring the distance 134. In the event that the monitored distance 134 falls below the predetermined distance threshold (thereby indicating that both arms 108, 110 have regained contact with crop rows, such as that shown in FIG. 5), the controller 204 may be configured to switch the harvester 10 from the second operating mode back to the first operating mode.

Moreover, in another embodiment, the controller 204 may be configured to switch between the first and second operating modes of the harvester 10 based on the position of the header 12 relative to the harvester frame 24. For example, when the header 12 is lowered relative to the ground by the header actuator 52 (thereby indicating that the harvester 10 is in a portion of the field in which crops are present), the controller 204 may be configured to switch the harvester 10 from the second operating mode to the first operating mode. Similarly, when the header 12 is raised relative to the ground by the header actuator 52 (thereby indicating that the harvester 10 is in a headlands or another portion of the field devoid of crops), the controller 204 may be configured to switch the harvester 10 from the first operating mode to the second operating mode.

Additionally, in a further embodiment, the controller 204 may be configured to switch between the first and second operating modes of the harvester 10 based on the location of the harvester 10 within the field. As indicated above, the controller 204 may be configured to determine the location of the harvester 10 within the field based on the received location data 216. When the harvester 10 is moving from a portion of the field that does not include crops to a portion of the field in which crops are present, the controller 204 may be configured to switch from the second operating mode to the first operating mode. Similarly, the controller 204 may be configured to switch from the first operating mode to the second operating mode when the harvester 10 transitions to the headlands or any other portion of the field in which crops are not present.

Figure 13:
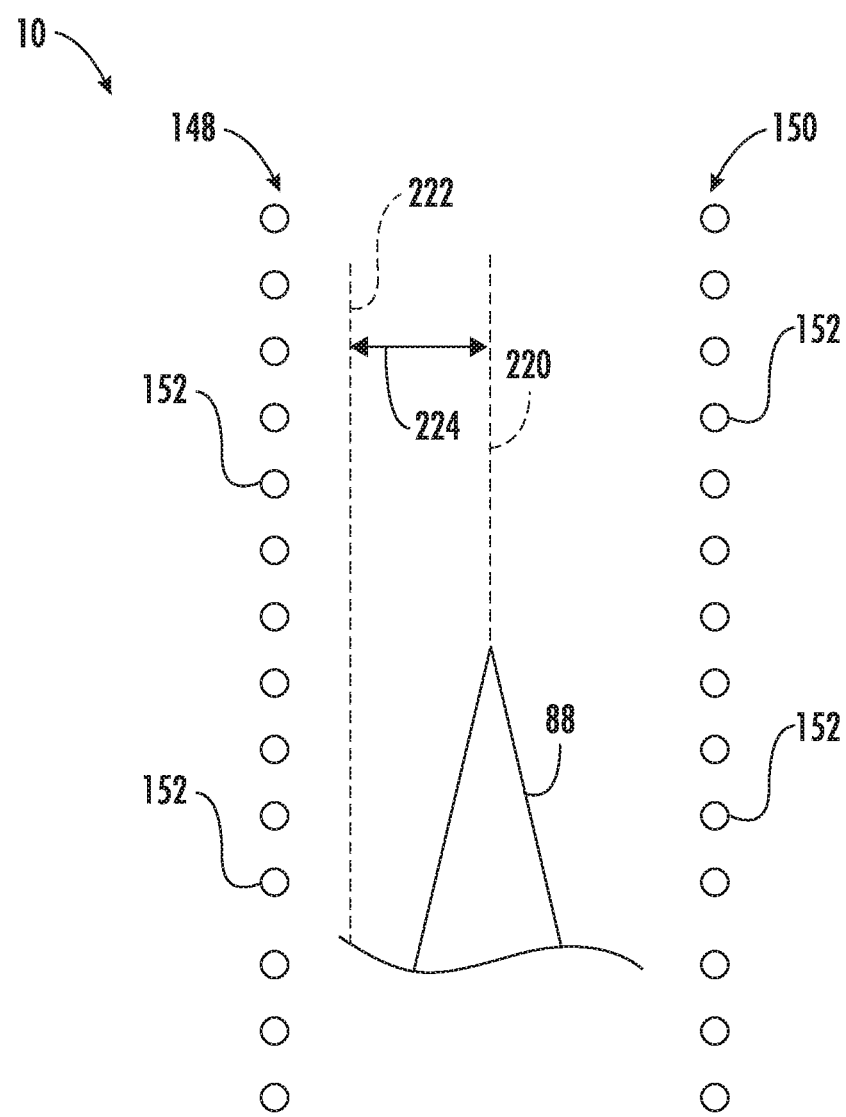
FIG. 13 illustrates a partial top view of the row divider shown in FIG. 5, particularly illustrating the row divider being moved along an operating line that is offset from a predetermined guidance line in accordance with aspects of the present subject matter.

Additionally, in accordance with aspects of the present subject matter, the controller 204 may be configured to adjust the position of the guidance line(s) of the harvester 10 when switching from the first operating mode to the second operating mode. As indicated above, when the harvester 10 is in the first operating mode, the controller 204 may be configured to control the forward direction of travel 14 of the harvester 10 based on the measurement signals 212 received from the first and second sensing devices 136, 138. In this respect, as shown in FIG. 13, the harvester 10 may be moved across the field such that one of the row dividers 88 (e.g., the row divider 88 on which the sensor assembly 100 is mounted) follows an operating line (e.g., as indicated by dashed line 220 in FIG. 13). In certain instances, the operating line 220 may differ from a predetermined guidance line (e.g., as indicated by dashed line 222 in FIG. 13). For example, a lateral offset or distance (e.g., as indicated by arrow 224 in FIG. 13) may be defined between the operating line 220 and predetermined guidance line 222, with the lateral offset 224 extending generally perpendicular to the direction of the operating and predetermined guidance lines 220, 222. Such lateral offset 224 may, for example, be caused when the actual positions of the crop rows within the field as detected by the sensor assembly 100 differ from the predicted locations of the crops based on the location data 216 or the field data, such as due to GNSS-based signal drift. In this regard, when the harvester 10 is in the first operating mode, the controller 204 may be configured to monitor the position of the operating line 220 based on the measurement signals 212 received from the first and second sensing devices 136, 138 of the sensor assembly 100. The controller 204 may then be configured to determine a differential defined between the operating line 220 and predetermined guidance line 222. Thereafter, the controller 204 may be configured to update a correction or nudge value stored within the controller's memory 208 based on the determined differential between the operating and predetermined guidance lines 220, 222, with the correction value generally being indicative of the determined differential between the operating and predetermined guidance lines 220, 222. Thereafter, when the harvester 10 is switched from the first operating mode to its second operating mode, the controller 204 may be configured to adjust the location of the predetermined guidance line 222 based on the stored correction value. It should be appreciated that, in several embodiments, the controller 204 may not update the location of the guidance line 222 based on the stored correction value when the harvester 10 is in the first operating mode. Additionally, in one embodiment, when the harvester 10 is in the second operating mode, the controller 204 may be configured to adjust the position of the guidance line 222 based on operator-initiated adjustments (e.g., based on the feedback signals 218 received from the user interface 210) to the forward direction of travel 14 of the harvester 10. Furthermore, it should be appreciated that the adjustment of the predetermined guidance line 222 may be based on the heading or direction of travel of the harvester 10 as the correction value is based on the error with respect to the heading.

Figure 14:
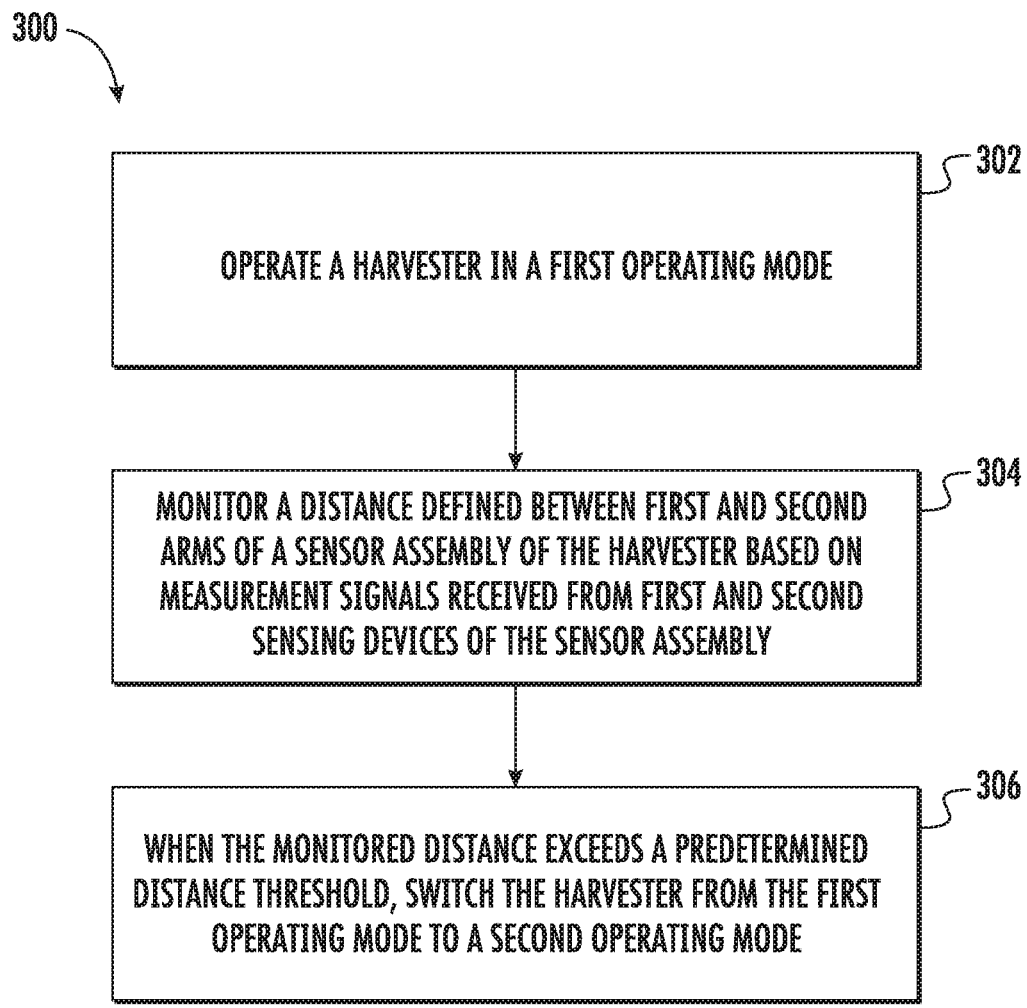
FIG. 14 illustrates a flow diagram of one embodiment of a method for operating an agricultural harvester in accordance with aspects of the present subject matter.

Referring now to FIG. 14, a flow diagram of one embodiment of a method 300 for operating an agricultural harvester is illustrated in accordance with aspects of the present subject matter. In general, the method 300 will be described herein with reference to the harvester, the sensor assembly 100, and the system 200 described above with reference to FIGS. 1-13. However, it should be appreciated by those of ordinary skill in the art that the disclosed method 300 may generally be utilized to operate any agricultural harvester having any suitable harvester configuration and/or in connection with any sensor assembly having any suitable assembly configuration and/or with any system having any suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (302), the method 300 may include operating, with a computing device, a harvester in a first operating mode. For instance, as described above, the controller 204 may be configured to control the operation of one or more components of the harvester 10 such that the harvester 10 is operated in a first operating mode.

Additionally, at (304), the method 300 may include monitoring, with the computing device, a distance defined between first and second arms of a sensor assembly of the harvester based on measurement signals received from first and second sensing devices of the sensor assembly. For instance, as described above, the controller 204 may be communicatively coupled to the first and second sensing devices 136, 138 of a sensor assembly 100, with the sensor assembly 100 being mounted on a row divider 88 of the harvester 10. Such sensing devices 136, 138 may be configured to detect first and second parameters indicative of a distance 134 defined between first and second arms 108, 110 of a sensor assembly 100. As such, measurement signals 212 transmitted from the first and second sensing devices 136, 138 may be received by the controller 204 and subsequently analyzed and/or processed to determine the distance 134 defined between the arms 108, 110.

Moreover, as shown in FIG. 14, at (306), the method 300 may include, when the monitored distance exceeds a predetermined distance threshold, switching, with the computing device, the harvester from the first operating mode to a second operating mode. For instance, as described above, the controller 204 may be configured to compare the determined distance 134 defined between the arms 108, 110 to a predetermined distance threshold. In the event that the determined distance 134 exceeds the predetermined distance threshold, the controller 204 may be configured to control the operation of one or more components of the harvester 10 such that the harvester 10 is switched from the first operating mode to the second operating mode.

Figure 15:
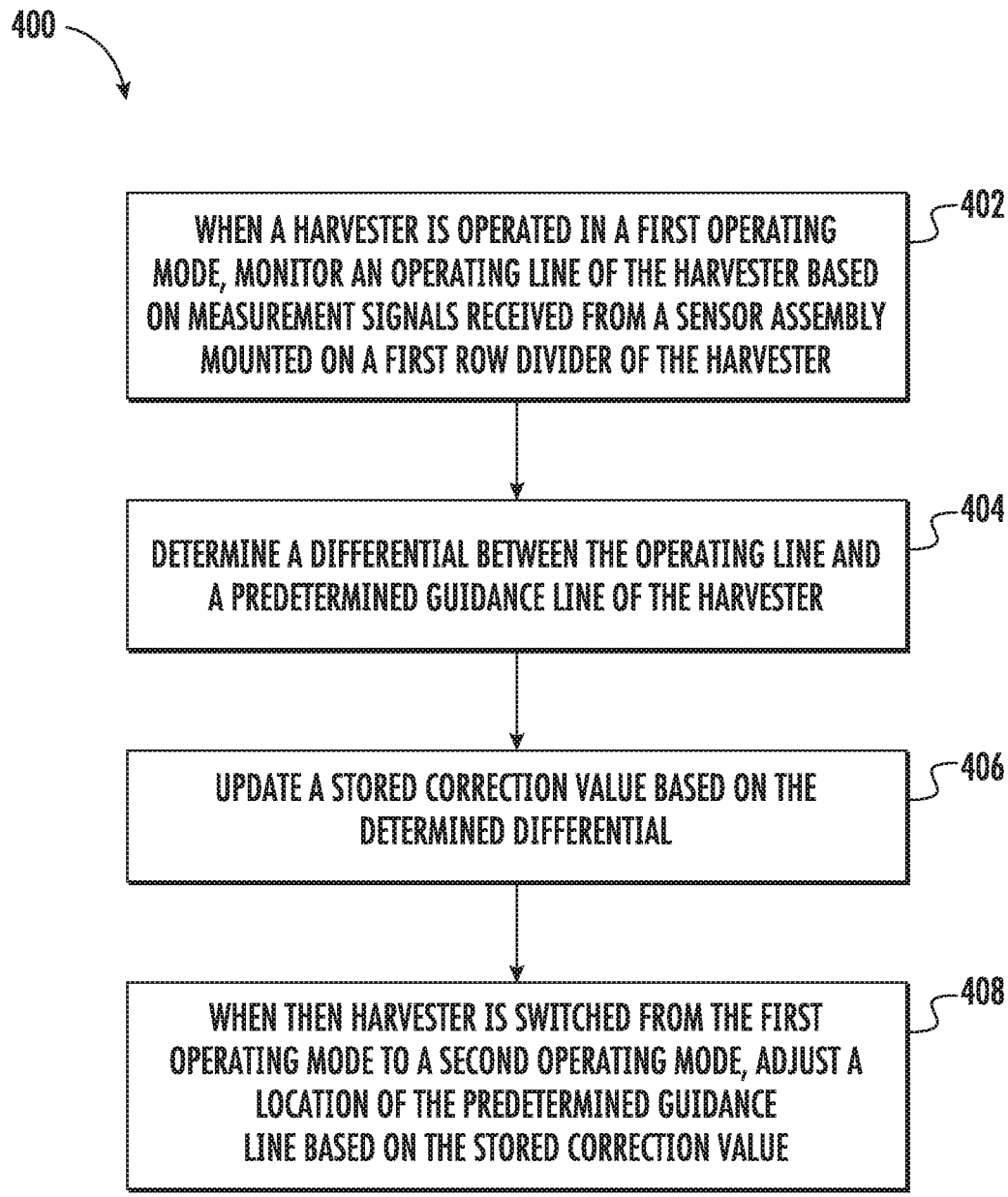
FIG. 15 illustrates a flow diagram of another embodiment of a method for operating an agricultural harvester in accordance with aspects of the present subject matter.

Referring now to FIG. 15, a flow diagram of another embodiment of a method 400 for operating an agricultural harvester is illustrated in accordance with aspects of the present subject matter. In general, the method 400 will be described herein with reference to the harvester, the sensor assembly 100, and the system 200 described above with reference to FIGS. 1-13. However, it should be appreciated by those of ordinary skill in the art that the disclosed method 400 may generally be utilized to operate any agricultural harvester having any suitable harvester configuration and/or in connection with any sensor assembly having any suitable assembly configuration and/or with any system having any suitable system configuration. In addition, although FIG. 15 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 15, at (402), the method 400 may include, when the harvester is operated in a first operating mode, monitoring, with a computing device, an operating line of the harvester based on measurement signals received from a sensor assembly mounted on a first row divider of the harvester. For instance, as described above, the controller 204 may be communicatively coupled to the first and second sensing devices 136, 138 of a sensor assembly 100, with the sensor assembly 100 being mounted on a row divider 88 of the harvester 10. Such sensing devices 136, 138 may be configured to detect first and second parameters indicative a location of an operating line along which the harvester 10 is traveling. As such, when the harvester 10 is operated in the first operating mode, measurement signals 212 transmitted from the first and second sensing devices 136, 138 may be received by the controller 204 and subsequently analyzed and/or processed to determine the location of the operating line.

Additionally, at (404), the method 400 may include determining, with the computing device, a differential between the operating line and a predetermined guidance line of the harvester. For instance, as described above, the controller 204 may be configured to compare the monitored location of the operating line of the harvester 10 to the location of a predetermined guidance line of the harvester 10 to determine a differential therebetween.

Moreover, as shown in FIG. 15, at (406), the method 400 may include updating, with the computing device, a stored correction value based on the determined differential. For instance, as described above, the controller 204 may be configured to update a correction value stored within its memory 208 based on the determined differential between the location of the operating line and the location of the predetermined guidance line.

Furthermore, at (408), the method 400 may include, when the harvester is switched from the first operating mode to a second operating mode, adjusting, with the computing device, a location of the predetermined guidance line based on the stored correction value. For instance, as described above, when the harvester 10 is switched from the first operating mode to the second operating mode, the controller 204 may be configured to adjust the location of the predetermined guidance line based on the stored correction value.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for operating an agricultural harvester, the system comprising:
a harvesting implement including a plurality of row dividers;
a sensor assembly mounted on a first row divider of the plurality of row dividers, the sensor assembly being configured to detect a parameter indicative of an operating line of the harvester; and
a controller communicatively coupled to the sensor assembly, the controller being configured to:
monitor the operating line of the harvester based on measurement signals received from the sensor assembly when the harvester is operated in a first operating mode;
determine a differential between the operating line and a predetermined guidance line of the harvester;
update a stored correction value based on the determined differential;
switch between the first and second operating modes based on movement of the harvesting implement relative to a frame of the harvester; and
when the harvester is switched from the first operating mode to a second operating mode, adjust a location of the predetermined guidance line based on the stored correction value.

2. The system of claim 1, wherein the differential corresponds to a lateral offset defined between the operating and predetermined guidance lines in a direction perpendicular to the operating and predetermined guidance lines.

3. The system of claim 1, wherein the controller is further configured to control a direction of travel of the harvester independently of the predetermined guidance line when the harvester is operated in the first operating mode.

4. The system of claim 3, wherein the controller is further configured to control a direction of travel of the harvester based on the measurement signals received from the sensor assembly when the harvester is operated in the first operating mode.

5. The system of claim 1, wherein, when the harvester is operated in the second operating mode, the controller is further configured to initiate steering of the harvester when it is determined that a location of the harvester and a location of the predetermined guidance line differ.

6. The system of claim 1, further comprising:
a location sensor configured to detect a parameter indicative of a location of the harvester within a field, the controller being communicatively coupled to the location sensor, the controller being further configured to determine the location of the harvester based on data received from the location sensor.

7. The system of claim 1, wherein, when the harvester is operated in the second operating mode, the controller is further configured to update the stored correction value based on an operator-initiated change in a direction of travel of the harvester.

8. The system of claim 1, wherein a location of the predetermined guidance line is at least partially based on one of previously captured field data or current location data of the harvester within a field.

9. The system of claim 8, wherein the controller is further configured to switch between the first and second operating modes based on the location of the harvester within the field.

10. A system for operating an agricultural harvester, the system comprising:
a harvesting implement including a plurality of row dividers;
a sensor assembly mounted on a first row divider of the plurality of row dividers, the sensor assembly being configured to detect a parameter indicative of an operating line of the harvester, wherein the sensor assembly comprises:
a base member pivotably coupled to the first row divider;
a first arm pivotably coupled to the base member, the first arm extending outwardly from the base member in a first direction relative to a centerline of the first row divider and rearwardly from the base member relative to a direction of travel of the harvester;
a second arm pivotably coupled to the base member, the second arm extending outwardly from the base member in a second direction relative to the centerline of first row member and rearwardly from the base member;
one or more biasing elements configured to bias the first and second arms outwardly relative to the centerline of the first row divider; and
first and second sensing devices configured to detect first and second parameters indicative of a distance defined between the first and second arms; and
a controller communicatively coupled to the sensor assembly, the controller being configured to:
monitor the operating line of the harvester based on measurement signals received from the sensor assembly when the harvester is operated in a first operating mode;
determine a differential between the operating line and a predetermined guidance line of the harvester;
update a stored correction value based on the determined differential; and
when the harvester is switched from the first operating mode to a second operating mode, adjust a location of the predetermined guidance line based on the stored correction value.

11. A method for operating an agricultural harvester, the harvester including a harvesting implement having a plurality of row dividers, the method comprising:
when the harvester is operated in a first operating mode, monitoring, with a computing device, an operating line of the harvester based on measurement signals received from a sensor assembly mounted on a first row divider of the plurality of row dividers;
determining, with the computing device, a differential between the operating line and a predetermined guidance line of the harvester;
updating, with the computing device, a stored correction value based on the determined differential;
switching between the first and a second operating modes based on movement of the harvesting implement relative to a frame of the harvester; and
when the harvester is switched from the first operating mode to a second operating mode, adjusting, with the computing device, a location of the predetermined guidance line based on the stored correction value.

12. The method of claim 11, wherein the differential corresponds to a lateral offset defined between the operating and predetermined guidance lines in a direction perpendicular to the operating and predetermined guidance lines.

13. The method of claim 11, further comprising:
when the harvester is operated in the first operating mode, controlling, with the computing device, a direction of travel of the harvester independently of the predetermined guidance line.

14. The method of claim 13, further comprising
when the harvester operated in the first operating mode, controlling, with the computing device, a direction of travel of the harvester based on the measurement signals received from the sensor assembly.

15. The method of claim 11, further comprising:
when the harvester is operated in the second operating mode, initiating, with the computing device, steering of the harvester when it is determined that a differential defined between a location of the harvester and a location of the predetermined guidance line exceeds a predetermined differential threshold.

16. The method of claim 11, further comprising:
when the harvester is operated in the second operating mode, updating, with the computing device, the stored correction value based on an operator-initiated change in a direction of travel of the harvester.

17. The method of claim 11, wherein a location the predetermined guidance line is at least partially based on one of previously captured field data or a location of the harvester within a field.

18. The method of claim 17, further comprising:
a location sensor configured to detect a parameter indicative of a location of the harvester within a field, the controller being communicatively coupled to the location sensor, the method further comprising:
determining, with the computing device, location of the harvester based on data received from the location sensor.

19. The system of claim 10, wherein the controller is further configured to switch between the first and second operating modes based on movement of the harvesting implement relative to a frame of the harvester.

* * * * *